US008942572B2

(12) United States Patent
Rothenberg

(10) Patent No.: US 8,942,572 B2
(45) Date of Patent: *Jan. 27, 2015

(54) METHODS AND SYSTEMS FOR ENCODING AND DECODING VISIBLE LIGHT WITH DATA AND ILLUMINATION CAPABILITY

(71) Applicant: Bret Rothenberg, Los Altos, CA (US)

(72) Inventor: Bret Rothenberg, Los Altos, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/186,481

(22) Filed: Feb. 21, 2014

(65) Prior Publication Data
US 2014/0270794 A1  Sep. 18, 2014

Related U.S. Application Data

(63) Continuation of application No. 13/826,996, filed on Mar. 14, 2013.

(51) Int. Cl.
*H04B 10/00* (2013.01)
*H04B 10/116* (2013.01)

(52) U.S. Cl.
CPC .................................. *H04B 10/116* (2013.01)
USPC ............ 398/172; 398/118; 398/128; 398/130; 398/127; 398/119; 398/202; 398/183; 398/194; 398/208; 315/291; 315/294; 315/312; 315/158; 315/307

(58) Field of Classification Search
USPC ......... 398/172, 128, 130, 118, 119, 135, 136, 398/182, 183, 189, 192, 193, 194, 186, 187, 398/196, 197, 190, 191, 202, 208, 209, 398/164; 315/151, 152, 153, 250, 291, 294, 315/158, 307, 312
See application file for complete search history.

(56) References Cited

U.S. PATENT DOCUMENTS

| | | |
|---|---|---|
| 3,866,177 A | 2/1975 | Kawamata et al. |
| 6,198,230 B1 | 3/2001 | Leeb et al. |
| 6,333,605 B1 | 12/2001 | Grouev et al. |
| 6,504,633 B1 | 1/2003 | Hovorka et al. |
| 6,504,635 B1 | 1/2003 | Nakashima |
| 6,548,967 B1 | 4/2003 | Dowling et al. |
| 6,680,586 B1 | 1/2004 | Chen |

(Continued)

OTHER PUBLICATIONS

Office Action dated Aug. 1, 2013, in U.S. Appl. No. 13/826,996, filed Mar. 14, 2013.

(Continued)

*Primary Examiner* — Hanh Phan
(74) *Attorney, Agent, or Firm* — Vierra Magen Marcus LLP

(57) ABSTRACT

A lighting system includes light fixtures not in communications with and not synchronized with one another, and one or more light sensors. Each light fixture separately emits data encoded visible light including light fixture information encoded therein in a manner that avoids visually perceptible flicker and enables light fixture information emitted by one light fixture to be distinguished from light fixture information emitted by other light fixtures. The light fixture information is encoded into data encoded visible light such that a difference between different levels of the data encoded visible light is indicative of an illumination capability of the light fixture and such that visually perceptible flicker is avoided. Each light sensor separately receives portions of data encoded light visible light emitted by multiple light fixtures and separately determines the identity of and the maximum and present illumination contributions for each light fixture.

25 Claims, 8 Drawing Sheets

(56) References Cited

U.S. PATENT DOCUMENTS

| | | |
|---|---|---|
| 7,446,671 B2 | 11/2008 | Giannopoulos et al. |
| 7,755,505 B2 | 7/2010 | Johnson et al. |
| 7,952,292 B2 | 5/2011 | Vegter et al. |
| 8,093,817 B2 | 1/2012 | Frumau et al. |
| 8,107,825 B2 | 1/2012 | Rajagopal et al. |
| 8,248,467 B1 | 8/2012 | Ganick et al. |
| 8,295,705 B2 | 10/2012 | Kim et al. |
| 8,588,616 B2* | 11/2013 | Langer et al. .......... 398/118 |
| 8,699,887 B1* | 4/2014 | Rothenberg ............ 398/172 |
| 2008/0262732 A1 | 10/2008 | Davis et al. |
| 2011/0069960 A1* | 3/2011 | Knapp et al. .......... 398/103 |
| 2012/0163826 A1 | 6/2012 | Schenk et al. |
| 2013/0009553 A1 | 1/2013 | Lee |

OTHER PUBLICATIONS

Notice of Allowance dated Nov. 26, 2013, in U.S. Appl. No. 13/826,996, filed Mar. 14, 2013.

IEEE, "Part 15.7: Short-Range Wireless Optical Communication Using Visible Light Communication", Sep. 6, 2011, 802.15.7 WPAN Task Group 7.

* cited by examiner

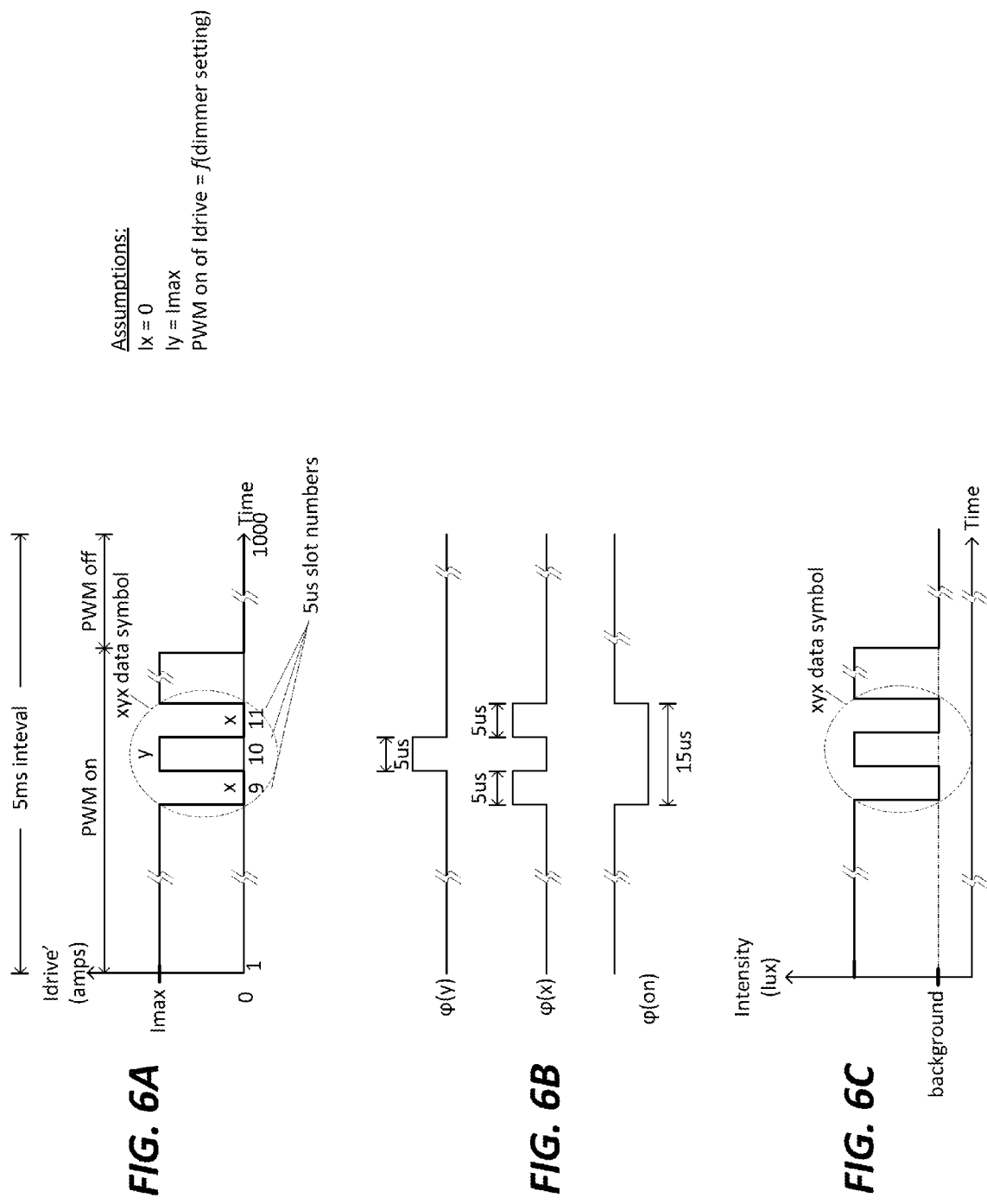

METHODS AND SYSTEMS FOR ENCODING AND DECODING VISIBLE LIGHT WITH DATA AND ILLUMINATION CAPABILITY

PRIORITY CLAIM

This application is a continuation of U.S. patent application Ser. No. 13/826,996, filed Mar. 14, 2014.

BACKGROUND

Light control systems have been used to control light fixtures in various environments, such as office buildings, retail stores, hospitals, schools, factories, and the like. In light control systems that include multiple light fixtures and multiple light controllers, there generally needs to be a way to assign which light fixtures are under control of which light controllers. There are several known approaches to making these assignments. One approach is to manually assign individual light fixtures to specific light controllers. However, this is a time consuming process that typically requires a person (e.g., an installer or user) to manually configure each light fixture to be assigned to a light control group or light controller. This time consuming process can include setting a group identifier (ID) on each light fixture, programming a unique light fixture ID into each light controller, or pairing a light fixture and a light controller through some combination of settings on both units. In more recent years, configurations of light control systems have become even more complex as these systems often also need to support control of the light levels based on additional information, such as occupancy information obtained from occupancy sensors and/or light level information obtained from light level sensors. Occupancy sensors (e.g., motion detection sensors) can be used, for example, to detect whether a space is occupied or empty, thereby enabling light fixtures to be selectively turned-off or dimmed when a space is empty. Light level sensors can be used, for example, to detect light levels within an environment, so that artificial light (produced by light fixtures) can be reduced when natural light (e.g., sunlight) is providing at least a portion of a desired level of light.

There have been significant efforts to use automation to improve the identification and assignment of light fixtures to light controllers. One approach involves commanding light fixtures, one at a time, to flash in order to identify themselves to a light controller. A drawback of this approach is that the flashing is visible perceptible as flicker, and thus, this approach does not lend itself to continuous or periodic use. Another approach involves adding additional dedicated infrared (IR) transmitters and receivers to light fixtures and light controllers, to allow the identification and assignment of light fixtures to light controllers to be made one at a time. Drawbacks of this approach are that only one light fixture can be identified and assigned to a light controller at a time, and additional IR transmitter electronics are required, which potentially increases costs.

SUMMARY

Embodiments of the present invention generally relate to lighting systems including light fixtures and light sensors, and methods for use by such lighting systems. Embodiments of the present invention also relate to light fixtures, and methods for use by light fixtures. Additionally, embodiments of the present invention relate to light sensors, and methods for use by light sensors.

In accordance with an embodiment, a lighting system includes a plurality light fixtures that are not in communications with one another, are not synchronized with one another, and are not under the control of a master controller. Additionally, the lighting system includes a one or more light sensors. Each of the light fixtures separately emits data encoded visible light that includes light fixture information corresponding to the light fixture encoded therein. Light fixture information, as the term is used herein, minimally includes a light fixture specific identifier (ID), e.g., a unique numeric or alphanumeric ID pre-assigned to or otherwise associated with a light fixture. The light fixture information can also include light fixture parameters, such as, but not limited to, a present dimmer setting, a maximum current rating for the light fixture, a luminous efficacy for the light fixture (e.g., in lumens per watt), a control key, an encryption key, supported dimming range, supported communication protocols, wireless control channel/frequency information, and the like. Further, light fixture information can include calibration information.

Advantageously, the data encoded visible light emitted by the plurality of light fixtures are emitted in a manner that avoids visually perceptible flicker and enables the light fixture information emitted by one of the light fixtures to be distinguished from the light fixture information emitted by other ones of the light fixtures. In accordance with certain embodiments, the light fixture information is encoded into the data encoded visible light such that a difference between different levels of the data encoded visible light is indicative of an illumination capability of the light fixture and such that the different levels of the data encoded visible light do not result in visually perceptible flicker. Additionally, the light fixture information is encoded into the data encoded visible light such that the dimming functionality of the light fixture is unaffected, and the dimming range of the light fixture is substantially unaffected. Each of the light sensors separately receives portions of the data encoded light visible light emitted by two or more of the light fixtures. Each of the light sensors also separately determines an identity of each light fixture that emitted visible light received by the light sensor. Additionally, each of the light sensors determines a maximum illumination contribution and/or present illumination contribution for each light fixture that emitted data encoded visible light received by the light sensor.

In accordance with certain embodiments, the data encoded visible light includes exactly N data symbol(s) encoded into each of a plurality of consecutive time intervals of the data encoded visible light, which contributes to visually perceptible flicker being avoided, where N is an integer that is equal to or greater than 1. In such embodiments, whenever a light source is emitting data encoded visible light, there will be exactly N data symbol(s) encoded in each and every time interval that occurs (while the light source is emitting the data encoded visible light), regardless of whether or not there is any change to the light fixture information encoded in the visible light. Each of the plurality of consecutive time intervals is a same length of time that is no greater than 8.33 milliseconds, which also contributes to visually perceptible flicker being avoided. For example, the length of each time interval can be 5 milliseconds, but is not limited thereto.

In accordance with certain embodiments, each light fixture produces a drive signal in dependence on a dimmer setting, and also produces a data signal that includes the light fixture information. The light fixture produces the data encoded drive signal that includes the light fixture information encoded therein by encoding data symbols corresponding to the light fixture information into the drive signal. In certain embodiments, the drive signal is a DC drive signal having a DC level that was specified in dependence on a dimmer setting. In such embodiments, the data symbols are encoded into the DC drive signal by selectively adjusting a magnitude of the DC drive signal. In alternative embodiments, the drive signal is a pulse width modulated (PWM) drive signal having a duty cycle that was specified in dependence on a dimmer setting. In such alternative embodiments, the data symbols are encoded into the PWM drive signal by selectively adjusting a magnitude of the PWM drive signal, preferably during on-times of the PWM drive signal.

In certain embodiments, data symbols, which are referred herein to as xyx data symbols, are employed. Such an xyx data symbol is encoded into the drive signal by setting or adjusting a magnitude of the drive signal to a first level (x) for at least a portion of a first specified duration of time, setting or adjusting the magnitude of the drive signal to a second level (y) for at least a portion of a second specified duration of time following the first specified duration of time, and setting or adjusting the magnitude of the drive signal to the first level (x) for at least a portion of a third specified during of time following the second specified duration of time. Such first, second and third durations of time can be, e.g., 5 microseconds each, but are not limited thereto. In such embodiments, a difference between the first and second levels (i.e., between the x and y levels) is indicative of an illumination capability of the light fixture. For example, the first level can correspond to 0% of a maximum current rating for the light fixture, and the second level can correspond to 100% of the maximum current rating for the light fixture. For another example, the first level can correspond to 20% of a maximum current rating for the light fixture, and the second level can correspond to 80% of the maximum current rating for the light fixture. A light sensor that receives such data symbols from a light fixture can determine an average difference between the first and second levels of the data symbol to thereby determine a maximum illumination contribution and/or present illumination contribution for the light fixture that emitted the data symbol. In certain embodiments, calibration factors are used when determining the maximum illumination contribution and/or present illumination contribution.

Embodiments of the present invention, described herein, can be used for a variety of lighting applications. For example, it is often desired to provide a certain level of illumination (often measured in lux or foot candles) for a specific worker or under specific working conditions. For specific examples, a worker that is doing general assembly activities may require only 200 lux on their work surface, while a worker that is doing detailed inspection work may require 500 lux on their work surface. Embodiments of the present invention described herein can be used to control light levels so that a target amount of light (also referred to as a target illumination level), without excess, can be provided for each worker, as well as to provide the target amount of light in the most energy efficient way possible. Generally, the most energy effective way to provide light is to supply from the closest and/or most direct focused light source(s). In other words, the system described herein can be used to identify the most efficient light fixture(s) to provide a target illumination and to individually command each of the available light fixtures to utilize a specific and optimized dimming level to achieve the target illumination level with the lowest power/energy usage.

This summary is not intended to summarize all of the embodiments of the present invention. Further and alternative embodiments, and the features, aspects, and advantages of the embodiments of invention will become more apparent from the detailed description set forth below, the drawings and the claims.

BRIEF DESCRIPTION OF THE DRAWINGS

FIG. 6A is used to illustrate how, in accordance with an embodiment, an xyx data symbol can be encoded into a PWM current drive signal having a duty cycle that is dependent on a dimmer setting.

FIG. 6B is a timing diagram that is used to illustrate how the symbol generator shown in FIG. 7 can be used to generate the data encoded current drive signal shown in FIG. 6A.

FIG. 6C illustrates exemplary light levels detected by a light sensor during a time interval, represented in FIGS. 6A and 6B, during which a light fixture emitted visible light having one xyx data symbol encoded therein.

DETAILED DESCRIPTION

Figure 1:
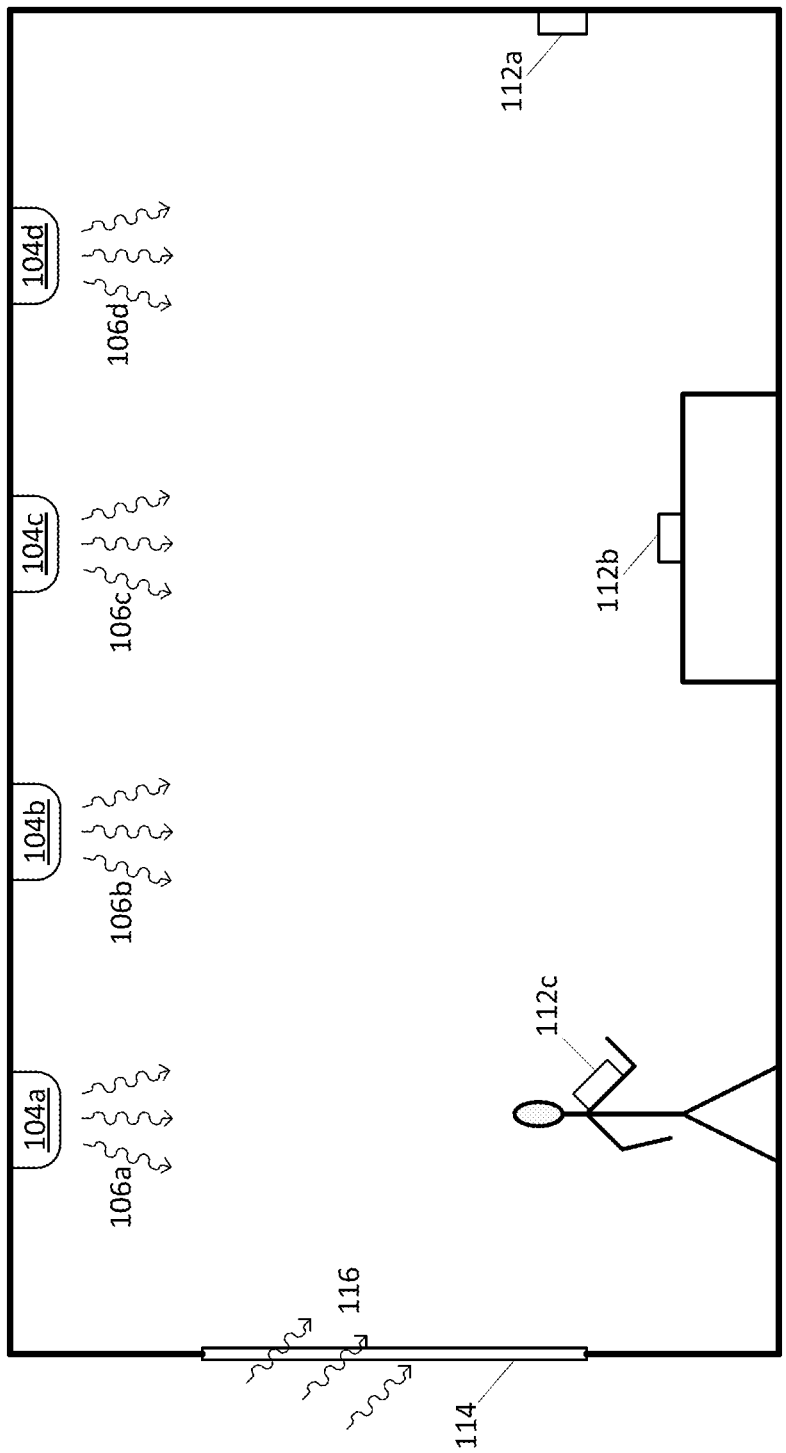
FIG. 1 illustrates an exemplary environment in which embodiments of the preset invention can be used, as well as a system according to an embodiment of the present invention.

In the following detailed description, reference is made to the accompanying drawings that form a part hereof, and in which is shown by way of illustration specific illustrative embodiments. It is to be understood that other embodiments may be utilized and that mechanical and electrical changes may be made. The following detailed description is, therefore, not to be taken in a limiting sense. In the description that follows, like numerals or reference designators will be used to refer to like parts or elements throughout. In addition, the first digit of a reference number identifies the drawing in which the reference number first appears.

FIG. 1 illustrates an exemplary environment in which embodiments of the preset invention can be used, as well as a system 102 according to an embodiment of the present invention. Referring to FIG. 1, the environment is shown as being a room that includes a plurality of light fixtures 104a, 104b, 104c and 104d, and a window 114. The light fixture 104a emits visible light 106a, the light fixture 104b emits visible light 106b, the light fixture 104c emits visible light 106c, and the light fixture 104d emits visible light 106d. The window 114 allows natural visible light 116, e.g., sunlight or moonlight, to enter the room. The environment 102 is also shown as including light sensors 112a, 112b and 112c, each of which can also be referred to herein as a data and illumination contribution decoder and illumination controller. The light sensor 112a is shown as being attached to a wall, the light sensor 112b is shown as being attached to or resting on a desk (which is an example of a work surface that is within a work area), and the light sensor 112c is shown as being attached to (e.g., clipped to or worn by) a person that is walking around the environment 102. For specific examples, the light sensor 112c can be attached to, mounted on, be part of (i.e., built into), or otherwise associated with a hat, ID badge, watch, wrist-band, eyeglasses, or the like. For a more specific example, the light sensor 112c can be a focused sensor that is built into augmented reality glasses or some other head mounted device (e.g., display) that enables the light sensor to detect an amount of visible light that a person's eyes are detecting.

The light fixtures 104a, 104b, 104c and 104d can collectively be referred to as light fixtures 104, and can individually be referred to as a light fixture 104. Similarly, the visible light 106a, 106b, 106c and 106d can collectively be referred to as visible light 106, and can individually be referred to as visible light 106. Additionally, the light sensors 112a, 112b and 112c can collectively be referred to as light sensors 112, and can individually be referred to as a light sensor 112.

The system 102 includes the light fixtures 104 and the light sensors 112. While the system 102 is shown as including four light fixtures 104, it should be understood that the system 102 can include more or less light fixtures 104 than shown. Similarly, the system 102 can include more or less light sensors 112 than shown. Further, the environment in which the system 102 is used can include more than one window, one or more of which can be a skylight type of window, or may even include no windows.

While each of the light fixtures 104 emits separate visible light 106, visible light 106 from the different light sources 104 as well as from the natural light 116 additively combine in a manner that a human is generally unable to distinguish between where emitted light originated. Nevertheless, different light fixtures 104 indeed contribute different amounts of visible light to light levels at different locations within the environment. For example, when the light sensor 112a detects visible light, it is likely that more of the detected visible light will have been emitted from the light fixture 104d than from the light fixture 104a, since the light sensor 112a is much closer to the light fixture 104d. As will be described in additional detail below, each light fixture 104 broadcasts its own light fixture information and its own illumination capability (IllCap), which is indicative of an illumination level that the light fixture can emit when at full brightness (i.e., at its minimum dimmer setting). Additionally, as will be described in additional detail below, each light sensor 112 that receives data encoded visible light from a light fixture 104 can decode the data encoded visible light in a manner that enables the light sensor 112 to determine: the identity of the light fixture and any other information encoded into a data payload; a maximum illumination contribution (MaxIllCon) for the light fixture, which is indicative of a maximum amount of light that the light fixture 104 can provide to the light sensor 112 if the light fixture were set to its full brightness (i.e., to its minimum dimmer setting); and a present illumination contribution (PrIllCon) for the light fixture, which is indicative of a present amount of light that the light fixture 104 is providing to the light sensor 112 at the light fixture's present brightness (i.e., at the light fixture's present dimmer setting).

Visible light, as the term is used herein, is electromagnetic radiation having a wavelength in the range of about 380 nanometers (nm) to about 740 nm, which is visible to the human eye. Infrared (IR) light, by contrast, which is not visible to the human eye, is electromagnetic radiation with longer wavelengths than those of visible light, extending from the nominal red edge of the visible spectrum at 740 nm to about 1000 nm. Another example of non-visible light is ultraviolet light, which is electromagnetic radiation with shorter wavelengths than those of visible light, extending from about 10 nm to about 380 nm. It is also noted each of the light fixtures 104 will likely also emit non-visible light whenever the light fixture is emitting visible light 106. Nevertheless, since embodiments of the present invention encode/decode data and illumination capability levels into/from visible light, the following description will focus on the emission and detection of visible light. Similarly, while the natural light entering the room through the window 114 will likely also include non-visible light, any discussion of natural light in the following description will focus on natural visible light.

Figure 2:
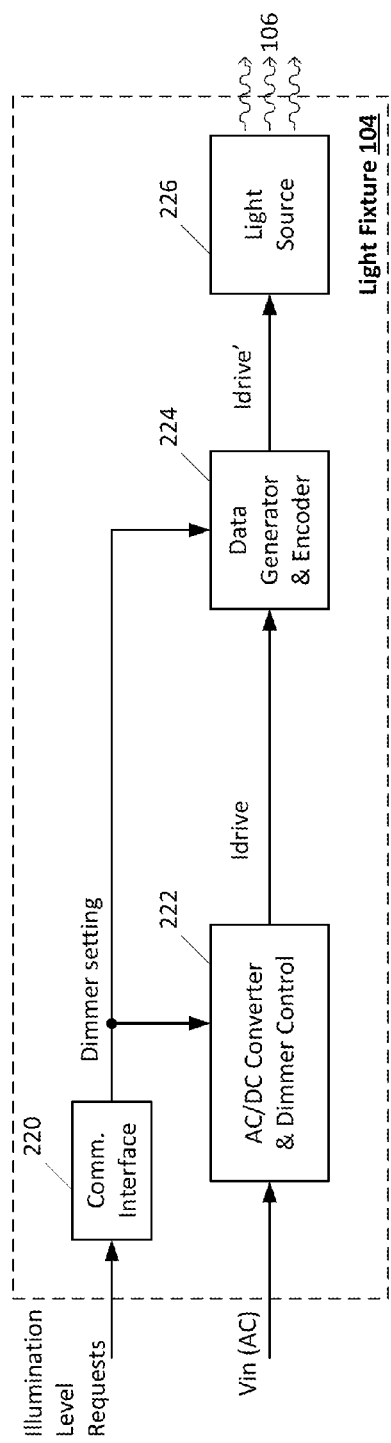
FIG. 2 is a high level block diagram of a light fixture, according to an embodiment.

FIG. 2 will now be used to describe additional details of each of the light fixtures 104, according to an embodiment of the present invention. Referring to FIG. 2, the light fixture 104 is shown as including an AC/DC converter and dimmer control circuit 222, a data generator and encoder 224 and a light source 226. The AC/DC converter and dimmer control circuit 222 receives an AC input voltage, labeled Vin (AC), and a dimmer setting, and generates a drive current (Idrive) in dependence on the dimmer setting. The data generator and encoder 224, as will be described in additional detail below, receives the drive current (Idrive), encodes data and illumination capability level information therein, and outputs a data encoded drive signal (Idrive'). The light source 226, in response to being driven by the data encoded drive signal (Idrive'), emits data encoded visible light having the data and illumination capability level information encoded therein. As will be described in additional detail below, the data and illumination capability level information is encoded in such a manner that visually perceptible flicker is avoided. Further, the data and illumination capability level information is encoded in such a manner that each light sensor 112 can separately determine an identity of each light fixture that emitted visible light received by the light sensor 112, and an illumination level capability (relative to the light sensor 112) of each light fixture that emitted visible light received by the light sensor 112.

The dimmer setting, which is provided to the AC/DC converter and dimmer control circuit 222, can be a digital signal representing a dimmer setting or an analog signal representing the dimmer setting, as would be appreciated by one of ordinary skill in the art. There are various well known circuits for converting an AC voltage to a drive current (Idrive) in dependence on a dimmer setting. Accordingly, there is no need to provide details of the AC/DC converter and dimmer control circuit 222. Nevertheless, the two most prevalent techniques for performing dimming are briefly discussed. One type of dimming, which can be referred to as DC dimming, achieves different dimming levels by generating a DC drive signal having a magnitude (i.e., DC level) that is adjusted based on the dimmer setting. Where DC dimming is used, the greater the DC level of the drive signal the greater the illumination level (i.e., the greater the number of lumens) of the visible light 106 emitted by the light source 226.

Another type of dimming, which can be referred to as pulse width modulated (PWM) dimming, achieves different dimming levels by adjusting the duty cycle of a PWM drive signal. Where PWM dimming is used, the greater the duty cycle of the drive signal the greater the illumination level (i.e., the greater the number of lumens) of the visible light 106 emitted by the light source 226. Thus, if the AC/DC converter and dimmer control circuit 222 is configured to perform DC dimming, then the magnitude of the drive current (Idrive) output by the circuit 222 will be dependent on the dimmer setting. On the other hand, if the AC/DC converter and dimmer control circuit 222 is configured to perform PWM dimming, then the duty cycle of drive current (Idrive) output by the circuit 222 will be dependent on the dimmer setting. As will be described in additional detail below, embodiments of the present invention can be used with either type of dimming. It is also noted that if a power supply (not shown) provided a DC voltage rather than an AC voltage, then the circuit 222 can instead be a DC/DC converter and dimmer control circuit 222.

The light fixture 104 is also shown as including a communications interface 220 that receives illumination level requests from one or more light sensors 112. Where conflicting requests are received, conflict resolution techniques can be used to determine which request is given priority. Standard communications links (e.g., ZigBee, Wibree, X-10, DALI, TIA-232, TIA-485, Ethernet, DMX512, EnOcean, Konnex, LonWorks, Z-Wave, 6LoPAN, Echelon, Bluetooth, Wi-Fi, etc.) can be used to transfer such requests from light sensors 112 to light fixtures 104.

The light source 226 can include one or more light emitting elements that are configured to emit visible light in response to a drive current. To enable the encoding techniques of embodiments of the present invention to be achieved, without generating visually perceptible flicker, the light emitting element(s) of the light source 226 should be capable of being modulated at a rate of at least 240 Hz, and preferably at a rate of at least 2.4 kHz. Examples of light emitting elements that can be modulated at a rate of at least 2.4 kHz include, but are not limited to, light emitting diodes (LEDs), organic LEDs (OLEDs), plasma light emitting elements as well as other types of lighting. It is also within the scope of embodiments of the present invention that other types of presently available or future developed types of light emitting elements that can be modulated at a rate of at least 240 Hz be used to provide the light source 226.

Figure 3:
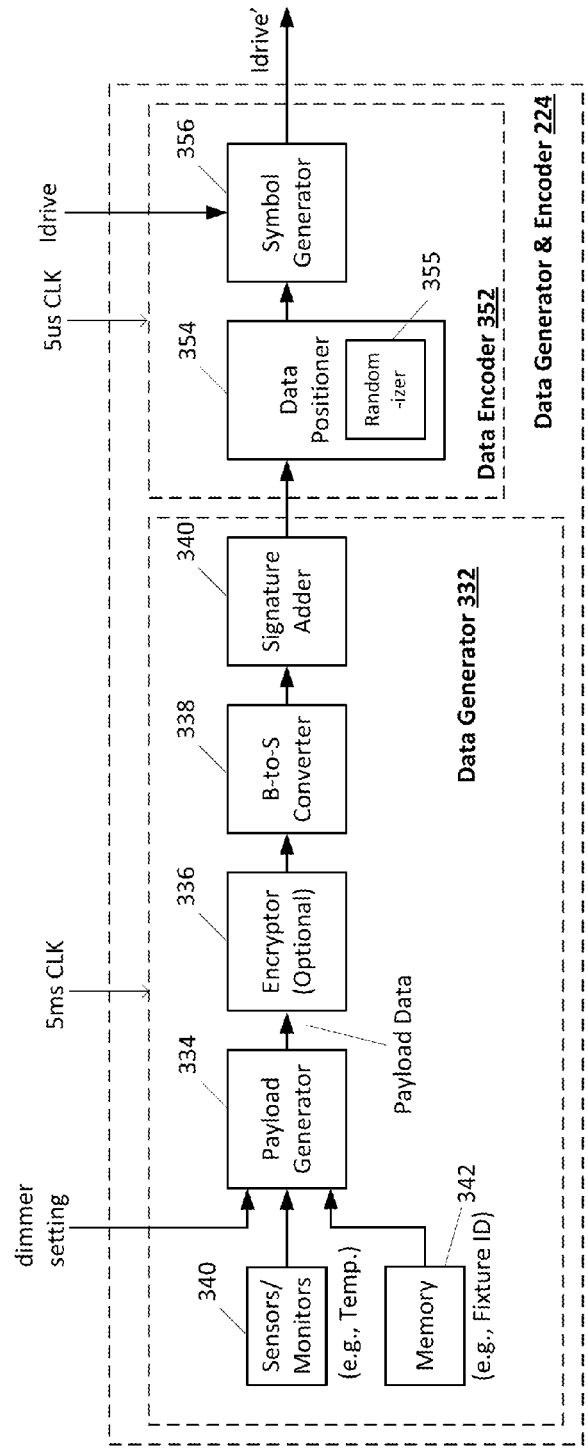
FIG. 3 illustrates additional details of the data generator and encoder shown in FIG. 2, according to an embodiment.

FIG. 3 will be used to describe additional details of the data generator and encoder 224, according to an embodiment of the present invention. Referring to FIG. 3, the data generator and encoder 224 is shown as including a data generator 332 and a data encoder 352. The data generator 332 is shown as including a payload generator 334, an optional encryptor 336, a binary-to-slot (B-to-S) converter 338 and a frame signature (e.g., preamble) adder 340. The data encoder 352, which is shown as including a data positioner 354 and a symbol generator 356, outputs the data encoded drive signal (Idrive') that is used to drive the light source 226.

Figure 4:
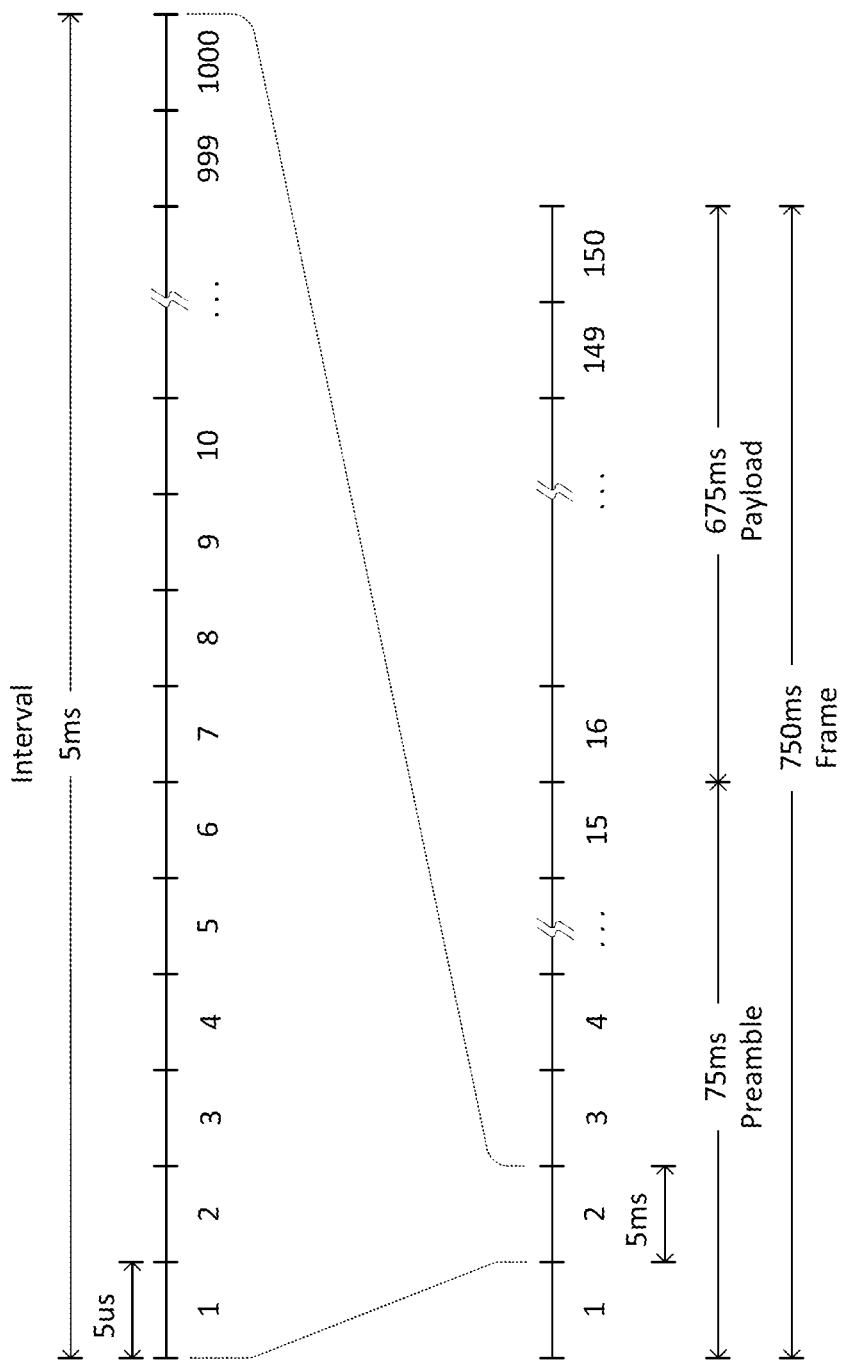
FIG. 4 is used to describe the relative timing of frames, intervals and slots in which data and illumination capability information are encoded, in accordance with certain embodiments of the present invention.

Before describing the components of the data generator and encoder 224 in additional detail, it is first useful to explain how data can be encoded into the drive signal (Idrive) to produce the data encoded drive signal (Idrive') that is used to drive the light source 104, so that the light source 226 emits data encoded visible light 106. In accordance with an embodiment, the data encoded drive signal (Idrive'), and thus, the data encoded visible light 106, includes a plurality of consecutive time frames, which can also be referred to simply as frames. As illustrated in FIG. 4, each of the frames includes I consecutive time intervals (e.g., I=150), which can also be referred to simply as intervals. Each of the intervals includes S consecutive time slots (e.g., S=1000), which can also be referred to simply as slots. Thus, each of the frames includes I*S slots, where I and S are integers. For example, if I=150 and S=1000, then each frame includes 150*1000 slots=150,000 slots. Explained another way, each frame is divided into I (e.g., 150) intervals, and each interval is divided into S (e.g., 1000) slots. As explained below, alternative frame, interval and slot lengths can be used, and each frame can include more or less than 150 intervals, and each interval can include more or less than 1000 slots.

In accordance with an embodiment, each of the intervals is 5 milliseconds (ms), and each of the slots is 5 microseconds (us). Accordingly, if each frame includes 150 intervals, then each frame is 750 ms (i.e., 150*5 ms=750 ms), as shown in FIG. 4. In accordance with the embodiment illustrated in FIG. 4, the frame signature is a preamble that is encoded into 15 frames (e.g., 75 ms), and the data payload is encoded into 135 frames (e.g., 675 ms) that follow the preamble. However, as will be discussed below, alternative types of frame signatures can be used.

To avoid visually perceptible flicker, the data encoded drive signal (Idrive'), and thus, the data encoded visible light 106 emitted by a light fixture 104, should include exactly N data symbol(s) encoded into each of the plurality of consecutive intervals of the data encoded visible light 106, where N is an integer that is equal to or greater than 1. If the number of data symbols per interval varied, this would likely result in visually perceptible flicker. For example, if 1 data symbol was placed in each of the first two intervals of a frame, 2 data symbols were placed in the next two intervals of the frame, and this pattern was repeated for the entire frame, then the illumination level would vary every 10 ms, which corresponds to a frequency of 100 Hz, which is undesirable since humans can visually perceive flicker at frequencies below 120 Hz. For much of this description it will be assumed that N=1. However, there will also be an explanation as to how N can be greater than 1. Each individual data symbol can either correspond to a portion of a frame signature or a portion of a data payload. It is also possible that one or more "dummy" data symbols be used to ensure satisfaction of the rule that exactly N data symbol(s) are encoded into each of the plurality of consecutive intervals of the data encoded visible light. Such "dummy" data symbols could be identical to data symbols that correspond to portions of a frame signature or a data payload, but are not be used to encode useful information.

Additionally, to avoid visually perceptible flicker, each of the plurality of consecutive time intervals is a same length of time that is no greater than 8.33 milliseconds (ms). The reason that intervals cannot be greater than 8.33 ms is that humans visually perceive flicker at frequencies below 120 Hz (i.e., $\frac{1}{120}$ Hz=8.33 ms). Additionally, there are standards (e.g., ENERGY STAR standards) that specify that the minimum LED operating frequency for LED lamps is 120 Hz. Some humans visually perceive flicker more than others. To provide further assurances that humans will not visually perceive flicker, the interval frequency can be increased to 150 Hz, or even to 200 Hz or higher. For much of this description it will be assumed that the interval frequency is 200 Hz, and thus, that each interval is 5 ms (i.e., $\frac{1}{200}$ Hz=5 ms). However, it is noted that intervals of other lengths can be used, so long as the intervals have a same length of time that is no greater than 8.33 ms. In other words, while each interval shown in FIG. 4 is shown as being 5 ms, each interval can be some other length so long as the length does not exceed 8.33 ms. Further, while in certain embodiments each frame includes 150 intervals, each frame can alternatively include more or less than 150 intervals. Additionally, while in certain embodiments each interval includes 1000 slots, each interval can alternatively include more or less than 1000 slots. Other variations are possible, as described below.

In accordance with an embodiment, where N=1 (i.e., where exactly 1 data symbol is encoded into each of the plurality of consecutive intervals), a 0 bit can be represented centering the data symbol at a first predetermined time slot (e.g., the $5^{th}$ time slot), and a 1 bit can be represented by centering the data symbol at a second predetermined time slot (e.g., the $10^{th}$ time slot) of the 1000 (or some other number of) slots that are included in each interval.

In accordance with specific embodiments, data symbols are encoded into the drive signal (Idrive) by selectively adjusting the magnitude (also referred to as level) of the drive signal (Idrive) to produce the data encoded drive signal (Idrive'). Depending on the type of light emitting element(s) included in the light source 226, there is a minimum time that the drive current level can be adjusted and result in a proportional change in the emitted visible light level. For a specific example, gallium nitride (GaN) type "blue" LEDs are commonly used in light sources (often known as LED lamps or LED light bulbs or "white" high brightness LED) to emit "white" light, by covering the LEDs in a phosphor or quantum dots, or blending the blue light with other colors produced by other LEDs. For GaN LEDs, that aforementioned minimum time has been determined, through experimental measurements, to be approximately 5 microseconds (us). Thus, for much of this description it will be assumed that the each level change (also referred to as a pulse), of the one or more level changes that make up each data symbol, is a 5 us level change (also referred to as a 5 u pulse). In specific embodiments described below, each data symbol is made up of three 5 us level changes (i.e., three 5 us pulses), and thus, each data symbol is 15 us. Such data symbols, for reasons that will be appreciated from the description below, will sometimes be referred to as xyx data symbols. However, it should be noted that each level change, of the one or more level changes that make up a data symbol, can alternatively be longer than 5 us. Further, if the light source includes light emitting element(s) that can respond more quickly to changes in a drive current, then each of the one or more level changes that make up a data symbol can potentially be shorter than 5 us.

Where N=1, each data symbol is an xyx data symbol made up of two 5 us "x" pulses surrounding a single 5 us "y" pulse, each of the "x" pulses corresponds to 0% brightness, and the "y" pulse corresponds to full (100%) brightness, then an illumination level of a light fixture can be reduced all the way down to 0.1% of its illumination capability, and all the way up to 99.8% of its illumination capability. This is because when the present dimmer setting (PrDimSet) of the light fixture is at its maximum dimmer setting (i.e., PrDimSet=0), there will only be only one 5 us "y" pulse each 5 ms, and 5 us/5 ms=0.001. Further, when the present dimmer setting (PrDimSet) of the light fixture is at its minimum dimmer setting (i.e., PrDimSet=1), there will be only two 5 us "x" pulses each 5 ms, and 1−(5 us*2)/5 ms=0.998. Accordingly, the light fixture information is encoded into the data encoded visible light such that the dimming range of the light fixture is substantially unaffected. If N was increased to be equal to 2, then an illumination level of a light fixture can still be reduced all the way down to 0.2% of its illumination capability, and all the way up to 99.6% of its illumination capability. Similarly, if the width of each pulse were increased to a width greater than 5 us, the total illumination level range for a light fixture would be reduced, as can be calculated using the aforementioned equations. However, one of ordinary skill in the art can appreciate from the above description how to encode data symbols into data encoded visible light in a manner that enables an illumination level for the light fixture to be adjusted, in response to a dimmer setting, down to at least 1% of the light fixture's illumination capability, and up to at least 99% of the light fixture's illumination capability. If N is made even larger and/or the width of each "x" and "y" pulse were even further increased, data symbols can still be encoded into data encoded visible light in a manner that enables an illumination level for the light fixture to be adjusted, in response to a dimmer setting, down to at least 5% of the light fixture's illumination capability, and up to at least 95% of the light fixture's illumination capability.

Where N=1, and each data symbol is an xyx data symbol made up of two 5 us "x" pulses surrounding a single 5 us "y" pulse, then a 15 us data symbol occurs only once each 5 ms. This means that out of every 5 ms that data encoded visible light is being emitted, there are 4.985 ms during which no data symbols are being transmitted. In other words, 99.7% of the time, there are no data symbols being transmitted by a light fixture. This enables many light fixtures to emit data encoded visible light in a common environment with a very low likelihood that data symbol collisions will occur. If N is made larger and/or the width of each "x" and "y" pulse is increased, then the percentage of time that no data symbols are being transmitted by a light fixture goes down. However, one of ordinary skill in the art can appreciate from the above description how to encode data symbols into data encoded visible light such that at least 95% of the time that a light fixture is emitting data encoded visible light there are no data symbols being transmitted.

Returning to the discussion of FIG. 3, the payload generator 334 is shown as receiving the present dimmer setting, receiving sensor information from one or more sensors and/or monitors 340, and receiving information from a memory 342. The payload generator 334 is also shown as outputting payload data, which includes the data that is to be encoded into the emitted visible light 106. As can be understood from FIG. 3, portions of such data can be obtained from the sensors and/or monitors 340. Additionally, portions of such data can be obtained from the memory 342.

The sensors and/or monitors 340 can be used to measure or monitor various operating parameters and can provide such parameters to the payload generator 334 so that data indicative of such parameters can be encoded into emitted visible light. Examples of such parameters include, but are not limited to, present dimmer setting, operating temperature, total operating hours, power supply fault conditions (e.g., over-voltage, under-voltage, short-circuit, open-circuit, over-current), fan not operating, cooling system failure, fan operating speed, remaining warranty period, calculated remaining operational lifetime, instantaneous power usage, historical power usage and a luminous efficacy (e.g., in lumens per watt). Accordingly, the sensors and/or monitors 340 can include, for example, various types of transducers, timers, over-voltage detection circuitry, over-current detection circuitry, and the like.

The memory 342 can be used to store light fixture information including, but not limited to, a light fixture specific identifier (ID), a maximum current rating for the light fixture, a rated luminous efficacy for the light fixture (e.g., in lumens per watt), a control key for decryption of communicated data and/or to restrict control of the fixture, a supported dimming range, supported communication protocols (e.g., ZigBee, Wibree, X-10, DALI, TIA-232, TIA-485, Ethernet, DMX512, EnOcean, Konnex, LonWorks, Z-Wave, 6LoPAN, Echelon, Bluetooth, Wi-Fi, etc.)), wireless control channel/ frequency information, and the like. The memory 342 can be implemented using any know or future developed type of memory, such as, but not limited to, various types of random access memory (RAM), read only memory (ROM), EPROM, EEPROM, FLASH, registers, or combinations thereof, as would be understood by one of ordinary skill in the art.

The memory 342 can also store illumination calibration information, such as the x-y percentage calibration factor (PCF) discussed below, so that this information can be encoded into emitted visible light. Alternatively, the sensors and/or monitors 340 can include sensing circuitry that are used to measure the illumination calibration information in real time, such as the PCF, and provide such information to the payload generator 334. In an embodiment, the payload data (output by the payload generator 334) includes a predetermined number of binary data bits (e.g., 135 binary data bits, each of which can be a "0" or a "1") that is to be encoded into emitted visible light.

The payload data can optionally be encrypted, by the optional encryptor 336, using various different currently known or future developed data encryption techniques. Such encryption can be used to make data encoded visible light resistant to unauthorized decoding and/or resistant to corruption from interference signal. Exemplary encryption and encoding techniques that can be performed by the encryptor 336 includes, but are not limited to, Advanced Encryption Standard (AES) encryption, data scrambling, Reed-Solomon error correction coding, and CRC-16 cycle-redundancy checking Since these and other encryption and/or error-detection and correction techniques are already well known, and embodiments of the present invention are not specifically related to use of encryption, additional details of the types of optional encryption that can be performed are not provided. Further, the term payload data, as used hereafter, will be used to describe payload data that either has been or has not been encrypted.

The payload data is provided to the binary-to-slot (B-to-S) converter 338. The B-to-S converter 338 converts binary (i.e., 0 and 1) data bits to time slot values, in accordance with an embodiment. For example: each 0 bit can be converted to a time slot value of 5; and each 1 bit can be converted to a time slot value of 10. Continuing with this example, and assuming that the payload data includes 135 bits, the output of the B-to-S converter can be 135 slot values (e.g., 5, 5, 10, 5, 5, 5, 10, 10 . . . ). This is just an example, which is not meant to be limiting. For another example: each 0 bit can instead be converted to a time slot value of 10 (or some other time slot value); and each 1 bit can be converted to a time slot value of 5 (or some other time slot value). In other embodiments, two (or more) data bits at a time are collectively converted to a time slot value. For example: a bit pair 0,0 can be converted to a time slot value of 5; a bit pair 0,1 can be converted to a time slot value of 10; a bit pair 1,0 can be converted to a time slot value of 15; and a bit pair 1,1 can be converted to a time slot value of 20. Other protocol variations are also possible, so long as the light fixtures 104 and light sensors 112 both are configured to implement the same protocol.

In the above examples, the B-to-S converter 338 was described as outputting exactly one slot value for each interval of a frame, and thus, N equaled 1, where N is the exact number of data symbol(s) encoded into each of the plurality of consecutive intervals of each frame of data encoded drive signal (Idrive'), and thus, encoded into each of the plurality of consecutive intervals of each frame of the data encoded visible light 106. In alternative embodiments, the B-to-S converter 338 outputs more than one slot value for each interval of each frame, and thus, N is greater than 1. In other words, if N=2, then the B-to-S converter 338 would output two slot values for each interval of each frame. The two slot values for each interval can correspond to a single bit, i.e., either a 0 bit or a 1 bit. Alternatively, the two slot values for each interval can correspond to two bits. For example, the B-to-S converter 338 can converter: a bit pair 0,0 to a pair of time slot values of 5 and 10; a bit pair 0,1 to a pair of time slot values of 15 and 20; a bit pair 1,0 to a pair of time slot values 25 and 30; and a bit pair 1,1 to a pair of time slot values of 35 and 40. There are just a few examples, which are not meant to be all encompassing. In other words, other variations are possible that are also within the scope of embodiments of the present invention.

Still referring to FIG. 3, the payload data is provided to the frame signature adder 340, which adds a predetermined frame signature (e.g., a predetermined preamble) to the payload data. The purpose of the frame signature (e.g., preamble) is to enable the sensors 112 to detect the frame signature, e.g., using matched filters or other correlation mechanisms, thereby enabling the sensor 112 to perform frame synchronization and decode the data payload. In specific embodiments, described with reference to FIG. 4, the frame signature is a preamble.

Referring again to FIG. 4, the exemplary preamble is shown as being included in the first 15 intervals of the 750 ms frame that includes a total of 150 intervals, with the remaining 135 intervals including the payload, wherein each of the 150 intervals includes 1000 slots. In such an embodiment, the preamble can include almost any predetermined sequence of 15 slot values (e.g., 1, 80, 900, 55 . . . ). Preferably, the preamble, or other frame signature, should be selected so that it is virtually impossible, or at least highly unlikely, that a portion of the payload data could be mistaken for the preamble or other frame signature. Preferably, the preamble or other frame signature should also be selected so that it has a minimum or very low amount of periodicity, which improves its capability of being detected in the presence of periodic interference, such as interference resulting from fluorescent lighting.

The preamble, or other frame signature, enables the light sensors 112 to detect the presence, identity and relative timing of each light fixture 104 without requiring that the light sensors 112 and light fixtures 104 receive clock signals from a common clock, and without requiring any coordination between the multiple light fixtures 104. In other words, there is no need for any type of master controller to communicate with the light fixtures 104 and the light sensors 112. There is also no need for any of the light fixtures 104 to communicate with one another or even be aware of the presence of other light fixtures 104. Further, there is no need for any of the light sensors 112 to communicate with one another or even be aware of the presence of other light sensors 112. Other types of frame signatures that can be used include, but are not limited to, frame signatures that are interspersed throughout each frame, rather than just being located at the start of each frame, as is the case with a preamble. It is also possible that the frame signature be midamble instead of a preamble, or that the frame signature include both a preamble and a midamble. These are just a few examples of the type of frame signatures that can be used, which are not meant to be all encompassing. For much of the remainder of this description, for the sake of consistency, it will be assumed that the frame signature is a preamble, even though embodiments of the present invention are not intended to be limited to the use of a preamble. Further, for the remainder of this description, the output of the data generator 332, which is provided to the data encoder 352, will often be referred to simply as a data signal.

Each of the light fixtures 104 should be configured to use a frame signature (e.g., a preamble) that is known by each of the light sensors 106 that is supposed to detect and decode data encoded visible light emitting by the light fixtures 104. All of the light fixtures 104 within a same environment can use the same frame signature, however that need not be the case. Individual light sensors can be configured to detect only one specific frame signature, or can be configured to be capable of detecting multiple different frame signatures.

In an embodiment, within a common environment (e.g., room), or adjacent environments (e.g., adjacent rooms), a first group of light fixtures can be configured to use a first frame signature and a first group of light sensors can be configured to detect only the first frame signature, and a second group of light fixtures can be configured to use a second frame signature and a second group of light sensors can be configured to detect only the second frame signature. This provides an easy and eloquent way to separate light fixtures and light sensors into different groups without needing to optically isolate the different groups. Additionally, this can also reduce light sensors' decode processing load.

As was explained above, e.g., with reference to FIG. 4, the data signal (output by the data generator 332) is made up of a plurality of consecutive frames. This data signal output by the data generator 332 is provided to the data encoder 352, which as mentioned above, is shown as including the data positioner 354 and the symbol generator 356. In an embodiment, the data positioner 354 is responsible for temporally encoding data into the drive signal (Idrive) through precise positioning of one pulse within one of the 1000 (or other number of) slots of each interval of each frame. For example, assume that a frame of the data signal includes 15 slot values (e.g., 1, 80, 900, 55 . . . ) corresponding to the preamble followed by 135 slot values corresponding to the payload (e.g., slot values 5, 5, 10, 5, 5, 5, 10, 10 . . . ). The data positioner 354 would place a pulse in the $1^{st}$ slot of the first interval, a pulse in the $80^{th}$ slot of the second interval, a pulse in the $900^{th}$ slot of the third interval, etc., until it completes the data positioning for the preamble of the frame. With respect to the payload (which in this example, begins at the $16^{th}$ interval of the frame), the data positioner 354 would place a pulse in the $5^{th}$ slot of the $16^{th}$ interval, a pulse in the $5^{th}$ slot of the $17^{th}$ interval, a pulse in the $10^{th}$ slot of the $17^{th}$ interval, etc., until it complete the data positioning for the payload of the frame. Where an alternative type of frame signature is used, e.g., which is dispersed throughout the frame, the data positioner 354 will function in the substantially the same manner.

The output of the data positioner 354, which can be referred to as a data positioned signal or a pulse positioned signal, is provided to the symbol generator 352. The symbol generator 352 is also shown as receiving the current drive signal (Idrive). In accordance with specific embodiments, the symbol generator 352 uses the pulse positioned signal to encode light fixture information into the Idrive signal, to generate the data encoded drive signal (Idrive'). The symbol generator 352 does this by embedding a data symbol centered at (or more generally, positioned at) each time slot of the each interval of each frame that includes a pulse. In other words, whenever the symbol generator 352 detects a pulse in the pulse positioned signal it receives from the data generator 332, the symbol generator embeds a data symbol into the drive signal. As mentioned above, the type of data symbol used can be what is referred to herein as an xyx data symbol, which shall be explained below with reference to FIGS. 5A-5C and 6A-6C.

As can be appreciated from FIG. 1, it is possible that multiple light fixtures 104 can emit data encoded visible light 106 having frames that begin at the same time with a same phase. To reduce the probability of this occurring, in accordance with specific embodiments, the data positioner 354 includes a randomizer 355 which selects a different starting time for each frame. More generally, the randomizer 355 causes a starting time for each of the time frames, relative to an immediately preceding one of the time frames, to change in a random, pseudo-random or other non-periodic manner within specified bounds, thereby reducing a probability that data encoded visible light emitted by the light fixture cannot be distinguished from data encoded visible light emitted by another light fixture.

The function implemented by the randomizer 355 can be, for example, as follows. Assume, as illustrated in FIG. 4, that each of the frames includes I consecutive time intervals, and each of the intervals includes S consecutive time slots, where I=150 and S=1000. Also assume that the data positioner 354 receives, from the data generator 332, a frame of a data signal includes 15 slot values (e.g., 1, 80, 900, 55 . . . ) corresponding to a preamble followed by 135 slot values corresponding to a payload (e.g., slot values 5, 5, 10, 5, 5, 5, 10, 10 . . . ). The randomizer 355 outputs a new pseudo-random value between 0 and S−1 (e.g., between 0 and 999) for each new frame that the data positioner 354 receives. The data positioner 354 then adds this pseudo-random value to each slot value it receives for the frame. The sum of the slot value and the pseudo-random value is then subject to a modulo S function (e.g., a modulo 1000 function), to thereby ensure that the value used for data positioning does not exceed S. In other words, the modulo S function ensures that the calculated slot time between data symbols in a frame remains correct and that the same number of data symbols will be placed each interval.

In accordance with embodiments of the present invention described herein, each light fixture 104 emits visible light having light fixture information encoded therein. Light fixture information, as the term is used herein, minimally includes a light fixture specific identifier (ID), e.g., a unique numeric or alphanumeric ID assigned to or otherwise associated with a light fixture 104. Light fixture information can also include one or more light fixture parameters obtained using the sensors and/or monitors 340, such as, but are not limited to, present dimmer setting, operating temperature, total operating hours, power supply fault conditions, fan not operating, cooling system failure, fan operating speed, remaining warranty period, calculated operational lifetime, current power usage, a peak current usage, historical power usage, luminous efficacy. Light fixture information can also other include information obtained from the memory 342, such as, but not limited to, a maximum current rating for the light fixture, a luminous efficacy for the light fixture (e.g., in lumens per watt), a control key, an encryption key, supported dimming range, supported communication protocols, wireless control channel/frequency information, and the like. Further, light fixture information can include illumination calibration information, such as the x-y percentage calibration factor (PCF) discussed below.

Visible light having light fixture information encoded therein can also be referred to simply as data encoded visible light. Since the data encoded visible light 106 emitted by a light fixture 104 may be detected by multiple light sensors 112 within an environment, it can be said that each light fixture 104 broadcasts its light fixture information. Similarly, since each light sensor 112 within an environment can receive light fixture information from multiple different light fixtures 104, it can be said the each light sensor 112 receives multiple broadcasts of light fixture information.

Figures 5A, 5B, 5C:
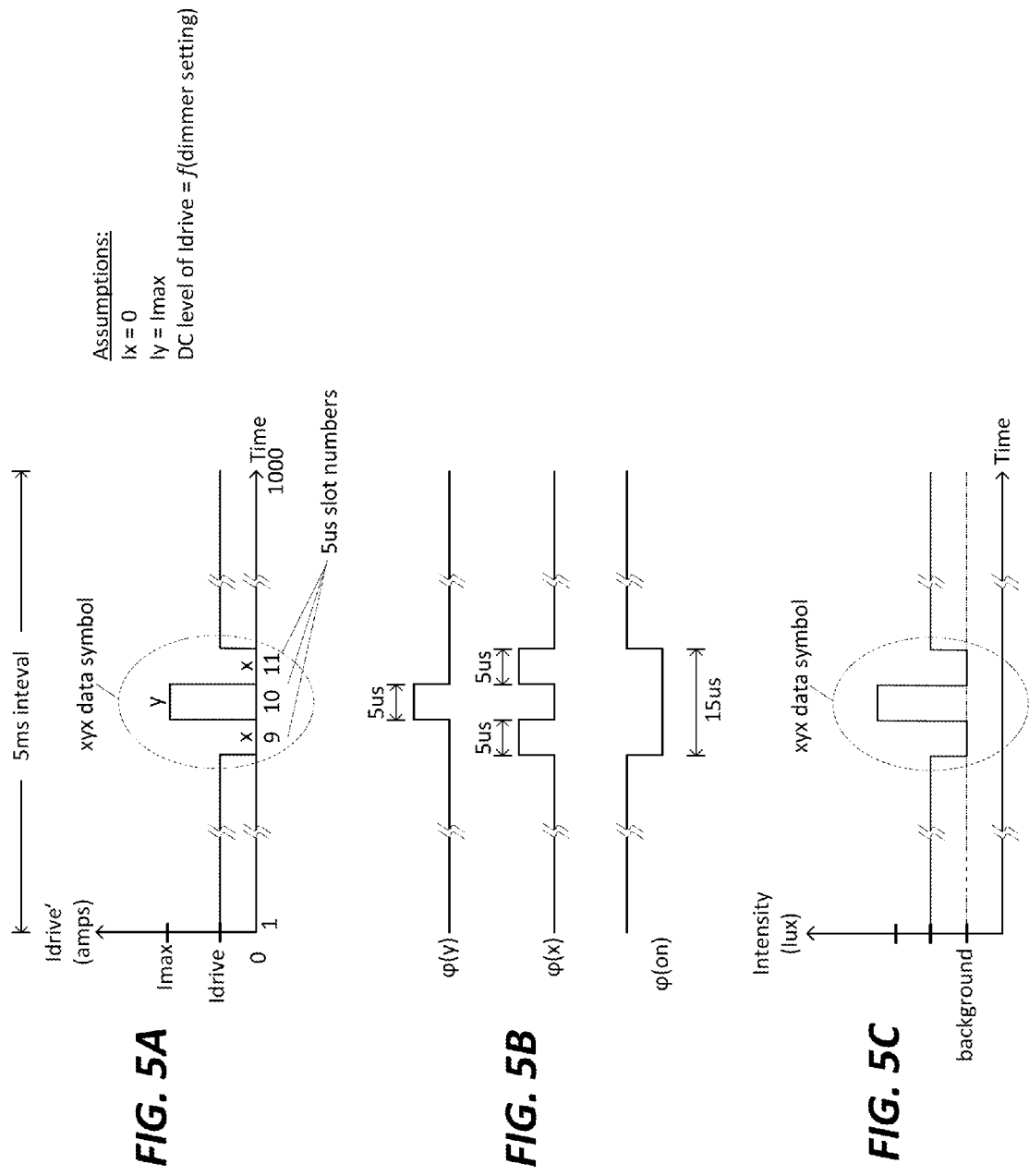
FIG. 5A is used to illustrate how, in accordance with an embodiment, an xyx data symbol can be encoded into a DC current drive signal having a magnitude that is dependent on a dimmer setting.
FIG. 5B is a timing diagram that is used to illustrate how the symbol generator shown in FIG. 7 can be used to generate the data encoded current drive signal shown in FIG. 5A.
FIG. 5C illustrates exemplary light levels detected by a light sensor during a time interval, represented in FIGS. 5A and 5B, during which a light fixture emitted visible light having one xyx data symbol encoded therein.

FIG. 5A will now be is used to illustrate how, in accordance with an embodiment, an xyx data symbol can be encoded into a DC current drive signal (having a magnitude which is dependent on a dimmer setting), wherein the encoding is performed in a manner that does not affect the dimming functionality of the light fixture, and in a manner that the dimming range of the light fixture is substantially unaffected. Referring to FIG. 5A, the xyx data symbol is generated, and more specifically encoded in the drive signal (Idrive) to produce the data encoded drive signal (Idrive'), by setting or adjusting the magnitude of Idrive to a first level (referred to as the x level) for a first specified duration of time (e.g., 5 us), setting or adjusting the magnitude of Idrive to a second level (referred to as the y level) for a second specified duration (e.g., 5 us) of time following the first specified duration of time, and setting or adjusting the level of the Idrive back to the first level (i.e., the x level) for a third specified during of time (e.g., 5 us) following the second specified duration of time. Through experimentation it has been proven that these xyx data symbols can be readily encoded into Idrive to produce Idrive', and can be readily detected and decoded by the light sensors 112 that receive data encoded visible light 106. In accordance with alternative embodiments, different types of data symbols can be used, such as, but not limited to, a yxy data symbol, an xy data symbol, or yx data symbol, or even more complex data symbols, such as data symbols that are longer than 15 us, or data symbols that include more than two different levels. For example, an xyz data symbol can include x, y and z levels which differ from one another (e.g., the z level can be between the x and y levels) and can occupy three slots. However, for consistency, for much of this description it will be assumed that each data symbol is an xyx data symbol.

It is noted that because of droop, ringing and/or other circuit realities, actual xyx (or other) data symbols will likely not be as perfectly shaped as shown in the FIGS., such as in FIG. 5A. For example, because of rise times and fall times associated with each transition between different current levels, the different levels may be achieved for only portions of durations of time. For another example, when a drive current is set or adjusted to a desired level (e.g., an x level, or a y level), it is possible that the desired level may be approached by not totally reached before there is a transition to another level. Nevertheless, the different levels can still be considered to be achieved. Further, such imperfect data symbols are still capable of being readily decoded by the light sensors.

The shape of the xyx data symbol in itself is not critical to avoiding visually perceptive flicker. However, it has been proved through simulations and experimentation that the xyx data symbol shape provides for excellent detection and decoding capability. Additionally, circuitry used to achieve the xyx data symbol shape is relatively inexpensive to implement.

In accordance with specific embodiments, the x level corresponds to 0% of a maximum current rating for the light fixture, and the y level corresponds to 100% of the maximum current rating for the light fixture. Accordingly, in such embodiments, for at least a portion of each 5 us period during which the drive current is reduced to zero, the light source 226 being driven by the data encoded drive signal (Idrive') will not emit any visible light 106. However, since this period of time is so short, humans will not be able to perceive any reduction in the light level. Further, in such embodiments, for at least a portion of each 5 us period during which the drive current is set to 100% of the maximum current rating for the light fixture, the light source 226 being driven by the data encoded drive signal (Idrive') may emit an increases level of light. Again, since this period of time is so short, humans will not be able to perceive any increase in the light level.

In the embodiment just described, the x level corresponded to 0% of the maximum current rating for a light fixture, and the y level corresponded to 100% of the maximum current rating for the light fixture. Data symbols constructed using x and y levels that correspond, respectively, to 0% and 100% of the maximum current rating provide for excellent detection and decoding performance. This is because the greater the difference between the x and y levels, generally the better the detection performance.

The maximum current rating for a light fixture typically refers to the maximum constant current level that could safely be used to drive the light source of the light fixture for a substantial length of time (e.g., on the order of thousands of hours). However, for many types of LED type light sources, it is possible to very briefly operate the LED(s) at much greater than their maximum constant current rating, and thus, the y level can potentially correspond to a level greater than 100% of the maximum current rating. For example, the y level can potentially correspond to between 110% and 400% of the maximum current rating, since the periods of time during which such relatively high levels of current are used would be very short (e.g., on the order of microseconds).

In accordance with other embodiments, alternative x and y levels are used. For example, the x level can correspond to a first percentage (e.g., 20%) of the maximum current rating for a light fixture, and the y level can correspond to a second percentage (e.g., 80%) of the maximum current rating for a light fixture. In one embodiment, these first and second percentages are predetermined. In other embodiments, these first and second percentages are dependent on the dimmer setting. In certain embodiments, where there the first and second percentages are dependent on the dimmer settings, these percentages can be calculated by a light fixture 104 using a mathematical formula or determined using a look-up-table, or the like. Alternatively, where there the first and second percentages are dependent on the dimmer settings, a light fixture 104 can determine these percentages through measurements. For example, if a measured x level of a data symbol is 3 amperes(A), a measured y level for a data symbol is 7 A, and the maximum current rating is 10 A, then the x level corresponds to 30% of the maximum current rating, and the y level corresponds to 70% of the maximum current level. Where the x and y levels can vary, information indicative of the first and second percentages corresponding to these levels can be included in the data payload, so that each light sensor 112 receiving the data encoded visible light 106 emitted by a light fixtures 104 can determine the maximum illumination contribution (MaxIllCon) and the present illumination contribution (PrIllCon) for that light fixture 104, as will be described in additional detail below.

Figure 7:
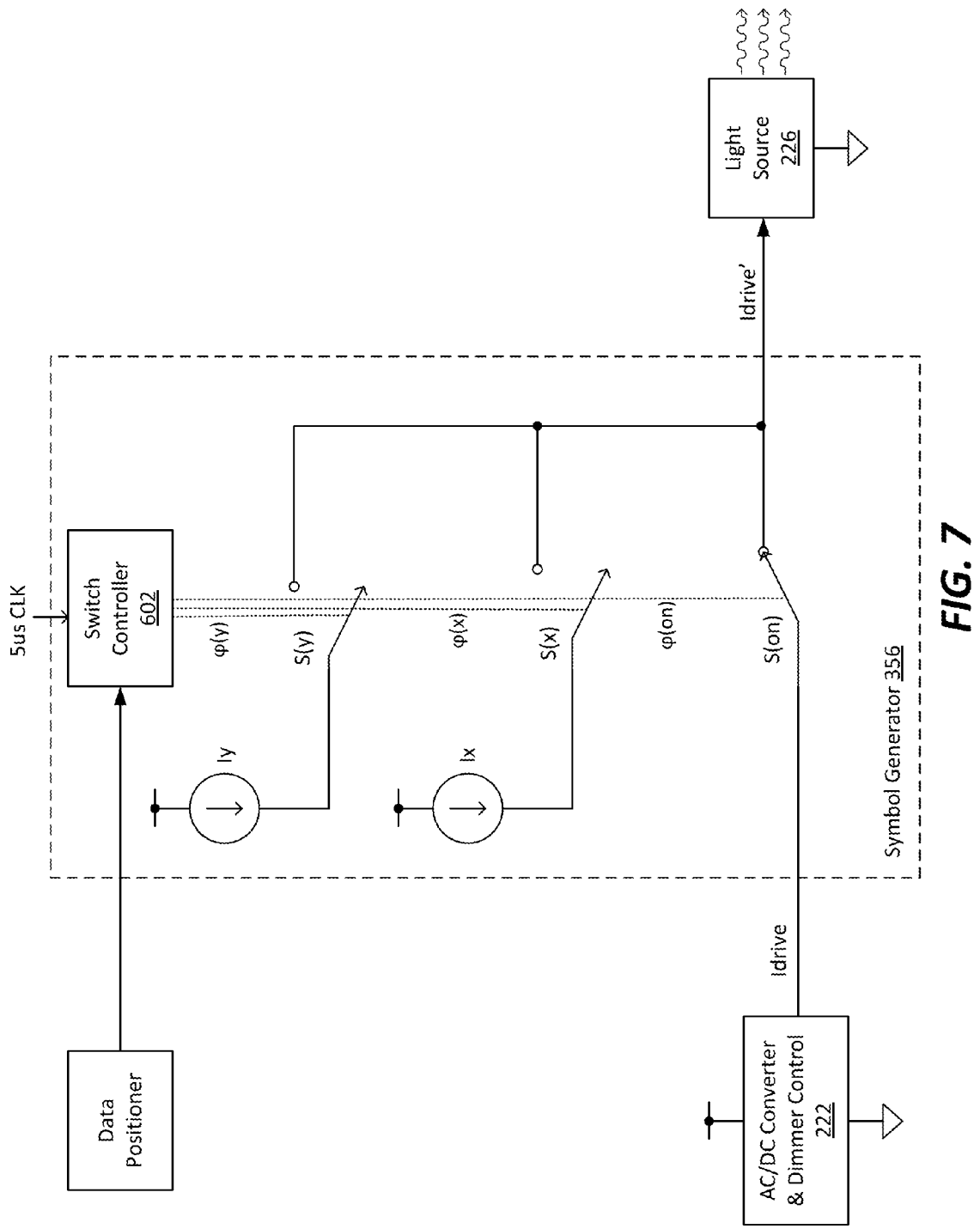
FIG. 7 illustrates additional details of the symbol generator shown in FIG. 3, according to an embodiment.

Referring briefly to FIG. 7, this FIG. illustrates exemplary details of the symbol generator 356 shown in FIG. 3, according to an embodiment, which can be used to produce the xyx data symbols described with reference to FIG. 5A. The symbol generator 356 is shown as including a switch controller 702 that controls switches S(y), S(x) and S(on), and current sources Iy and Ix. The timing diagram in FIG. 5B illustrates how the switches S(y), S(x) and S(on) can be controlled to produce the xyx data symbols described above with reference to FIG. 5A. Similar circuitry can be used to implement other types of data symbols, as would be appreciated by one of ordinary skill in the art. Further, one of ordinary skill in the art would understand, from the description herein, that alternative circuitry to can be used to produce the xyx data symbols or other data symbols, while still being within the scope of an embodiment of the present invention.

Referring briefly now to FIG. 5C, this FIG., which is discussed in additional detail below, illustrates exemplary light levels detected by a light sensor during a time interval, represented in FIGS. 5A and 5B, during which a light fixture emitted visible light having one xyx data symbol encoded therein.

The xyx data symbols illustrates in FIGS. 5A-5C were encoded into a DC drive signal (Idrive) having a magnitude which is dependent on a dimmer setting to thereby produce a data encoded drive signal (Idrive'). As mentioned above, data symbols can alternatively be encoded into a PWM drive signal (Idrive) having a duty cycle that is dependent on a dimmer setting. An example of such an xyx data symbol is shown in FIG. 6A. Preferably, as shown in FIG. 6A, the xyx data symbol is encoded into the PWM drive signal during the "on" portion of each duty cycle (as opposed to during the "off" period of each duty cycle). In both FIGS. 5A and 6A, the exemplary xyx data symbols are shown as being centered at the $10^{th}$ slot position of a 5 ms interval that includes 1000 slot positions. This positioning of the xyx data symbols, as mentioned above, is dependent on slot values received from the data generator 332, which are converted to pulse positions by the data positioner 335. The symbol generator 356 shown in FIG. 7 can also be used to encode the xyx data symbol into a PWM drive signal. The timing diagram in FIG. 6B illustrates how the switches S(y), S(x) and S(on) of the symbol generator 356 show in FIG. 7 can be controlled to produce the xyx data symbols described above with reference to FIG. 6A. FIG. 6C, which is discussed in additional detail below, illustrates exemplary light levels detected by a light sensor during a time interval, represented in FIGS. 6A and 6B, during which a light fixture emitted visible light having one xyx data symbol encoded therein.

As was recently explained above, in accordance with certain embodiments, the x and y levels of the data symbols are not only used to encode the data symbols such that they can be detected and decoded by the light sensors 112, but are also used to encode into the data symbols themselves the illumination capability (IllCap) of a light fixture. In other words, the x and y levels of each data symbol (included in data encoded visible light emitted by a light fixture) are themselves indicative of the illumination capability of the light fixture, and thus, each time a light fixture is emitting data encoded visible light including a data symbol encoded therein the light fixture is broadcasting its illumination capability in a manner that avoids visually perceptible flicker. Further, as will be described in additional detail below, the x and y levels of each data symbol (included in data encoded visible light emitted by a light fixture) enables each light sensor that receives the data encoded visible light to determine a maximum illumination contribution (MaxIllCon) and present illumination contribution (PrIllCon) for the light fixture that emitted the data encoded visible light. These concepts will be further described with reference to FIGS. 5C and 6C, which illustrates detected visible light levels corresponding to a time interval during which an Idrive' signal drives a light source 226 to emit data encoded visible light 106. For this discussion, it will initially be assumed that the y level corresponds to 100% of a maximum current rating for a light fixture 104, and the x level corresponds to 0% of the maximum current rating for the light fixture 104. More specifically, FIGS. 5C and 6C illustrates exemplary light levels detected by one of the light sensors 112 during a period of time that a light fixture 104 emitted visible light having one xyx data symbol encoded therein. Received light levels are typically measured in lux, which is a measure of luminous flux per unit area. Visible light is additive, as can be appreciated from FIGS. 5C and 6C, meaning that the visible light 106 emitted by a light source 104 is added to background light in the environment. The term background light, as used herein, is a light sensor relative term that refers to light generated by one or more other source(s) besides the specific light fixture from which a light sensor (or a channel of the light sensor) is currently attempting to detect and decode light fixture information. In other words, the background light may be natural sunlight entering a room through a window and/or light emitted by another light fixture within the same room, but is not limited thereto. As can be seen from FIGS. 5C and 6C, the xyx data symbol is recognizable within the detected visible light, and thus, can be decoded from the detected visible light.

In accordance with specific embodiments, by knowing or determining the percentages (of the maximum current rating of the light fixture) that correspond to the x and y levels, a light sensor 112 can determine a maximum illumination contribution (MaxIllCon) and a present illumination contribution (PrIllCon) for a light fixture that emitted the data symbols including the x and y levels. In specific embodiments, a difference between average detected 'x' levels and 'y' levels is determined for a plurality of data symbols within a detected frame. This difference between average detected 'x' levels and 'y' levels, which can be referred to hereafter as the average x-y delta, can be determined for a full frame, or just a portion thereof, such as just the payload portion or the preamble portion of a frame, or just a portion of the payload and/or the preamble. Each average is preferably a mean, but can alternatively be a median or a mode. Additionally, an x-y percentage calibration factor (PCF) can also be determined by dividing the average x-y delta by 100. For example, if the y level corresponds to 100% of the maximum current rating for a light fixture 104, and the x level corresponds to 0% of the maximum current rating for the light fixture 104, then the PCF=(100−0)/100=1. For another example, if the y level corresponds to 80% of maximum current rating of the light fixture 104, and the x level corresponds to 20% of maximum current rating of the light fixture 104, then the PCF=(80−20)/100=0.6. Additionally, a light sensor calibration factor (LSCF) can be determined using a calibration procedure. For example, assume each light sensor 112 includes an analog-to-digital converter (ADC) that outputs a digital value (referred to as an ADC value) indicative of a light level incident on the light sensor 112. The calibration procedure can involve illuminating a light sensor 112 with a well-controlled predetermined illumination level (e.g., 10 lux), measuring the ADC value at the output of the ADC (e.g., at the output of the ADC 906 in FIG. 9), and dividing the predetermined illumination level (e.g., 10 lux) by the ADC value. For example, if an average ADC value of 100 is produced when the light source 112 is illuminated with 10 lux, then the LSCF=10/100=0.1. Where different data symbols are used (i.e., besides the xyx data symbols) different calibration factors may be appropriate. For example, where xyz data symbols are used, there can be two calibration factors, including an x-y percentage calibration factor (PCF_yx) and a y-z percentage calibration factor (PCF_yz). These are just examples, which are not intended to be all encompassing.

In accordance with an embodiment, the MaxIllCon for a light fixture 104 can then be determined using the equation: MaxIllCon=(average x-y delta)*LSCF/PCF. For a specific example, if the average x-y delta measured at the ADC output=10 codes, the LSCF=0.1, and the PCF=0.6, then MaxIllCon=(average x-y delta)*LSCF/PCF=10*0.1/0.6=1.67 lux. In order to determine the PrIllCon for a light fixture, a light sensor needs to know the present dimmer setting (PrDimSet) for the light fixture, where the minimum dimmer setting=1 (which causes the least amount of dimming, and thus results in the greatest brightness level) and the maximum dimmer setting=0 (which causes the greatest amount of dimming, and thus results in the lowest brightness level). More specifically, in accordance with an embodiment, the PrIllCon for a light fixture can be determining using the equation: PrIllCon=MaxIllCon*PrDimSet. For a specific example, if the MaxIllCon=1.67 lux, and the PrDimSet=0.6, then PrIllCon=MaxIllCon*PrDimSet=1.67*0.6=1.002 lux. The present dimmer setting is an example of a parameter that can be included in a data payload of data encoded emitted visible light. Further, the present dimmer setting (PrDimSet) for a light fixture should be equal to the present output light level of the light fixture divided by the maximum output light level for the light fixture (i.e., the output light level achieved at the maximum current rating for the light fixture), which would ensure that the present dimmer setting is a value between 0 and 1, inclusive. If a light fixture is using its minimum dimmer setting, i.e., where PrDimSet=1, then the PrIllCon will equal the MaxIllCon.

If PCF=1, then MaxIllCon=(average x-y delta)*LSCF. Thus, in embodiments where the PCF is always going to be equal to 1 it is not necessary that the PCF value be used, as can be appreciated from the above equation. In embodiments where the PCF value is not equal to 1, but the PCF value is always the same predetermined value, then the PCF value can be stored within each light sensor 112. In embodiments where the PCF value varies, e.g., depending on the dimmer setting of the light fixture emitting the data encoded visible light, the PCF value can be transmitted as part of the payload. It would also be possible to transmit the PCF value as part of the payload even where the PCF value is fixed and predetermined.

In summary, in certain embodiments each light sensor 112 determines: a unique identity of each light fixture 104 that emitted data encoded visible light received by the light sensor; a maximum illumination contribution (MaxIllCon) for each light fixture that emitted data encoded visible light received by the light sensor; and a present illumination contribution (PrIllCon) for each light fixture that emitted data encoded visible light received by the light sensor. Additionally, each light sensor 112 can learn additional information about light fixtures from decoded payload data.

Figure 8:
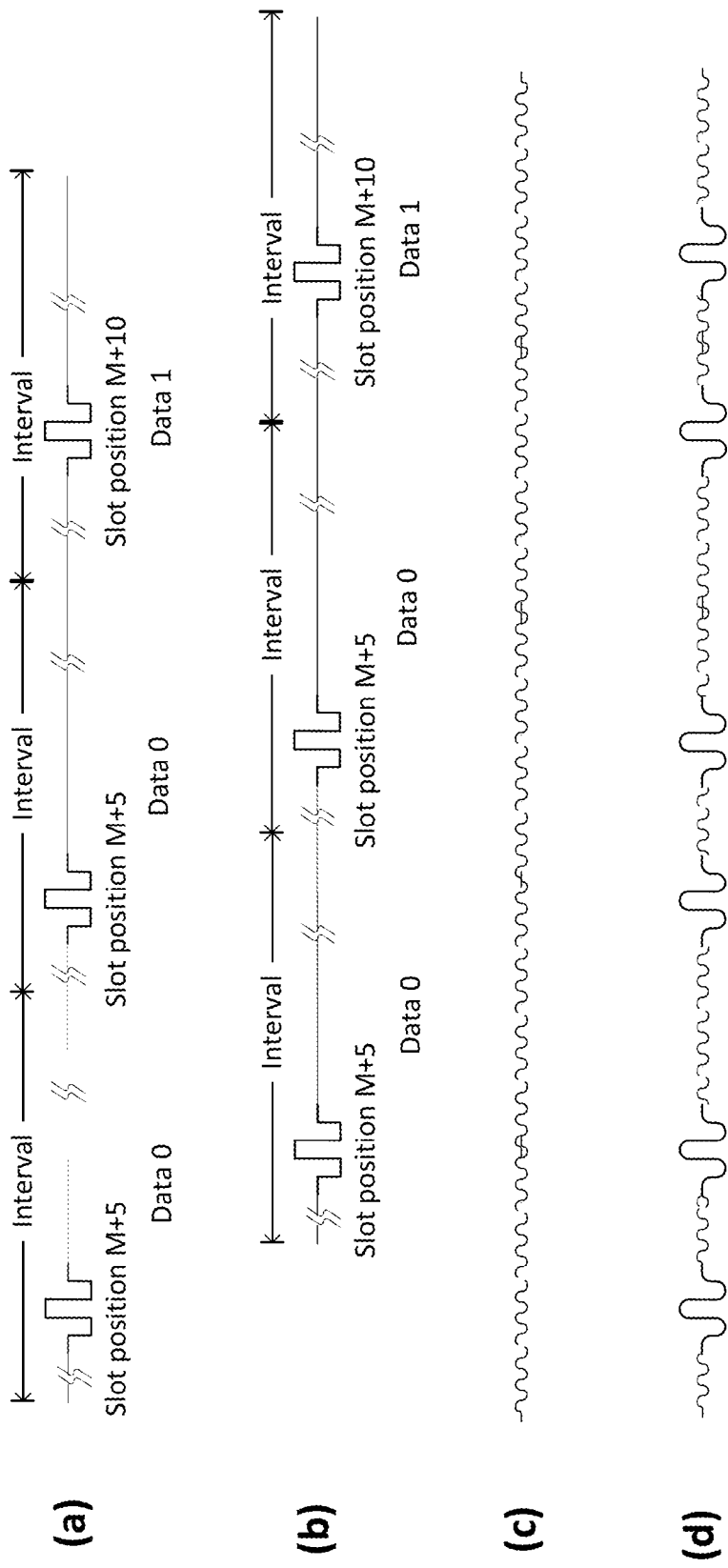
FIG. 8 includes waveforms that are used to conceptually illustrate that data symbols emitted by one light fixture are still detectable in the presence of data symbols emitted by other light fixtures as well as in the presence of periodic interference.

FIG. 8 includes waveforms labeled (a), (b), (c) and (d). The waveform (a) is used to illustrate a portion of data encoded visible light emitted by a first light fixture. The waveform (b) is used to illustrate a portion of data encoded visible light emitted by a second light fixture. The waveform (c) is used to illustrate an exemplary periodic interference signal. The waveform (d), which is the sum of the (a), (b) (c) waveforms, as might be detected by a light sensor, is used to conceptually illustrate that data symbols emitted by one light fixture are still detectable in the presence of data symbols emitted by other light fixtures as well as in the presence of periodic interference.

Figure 9:
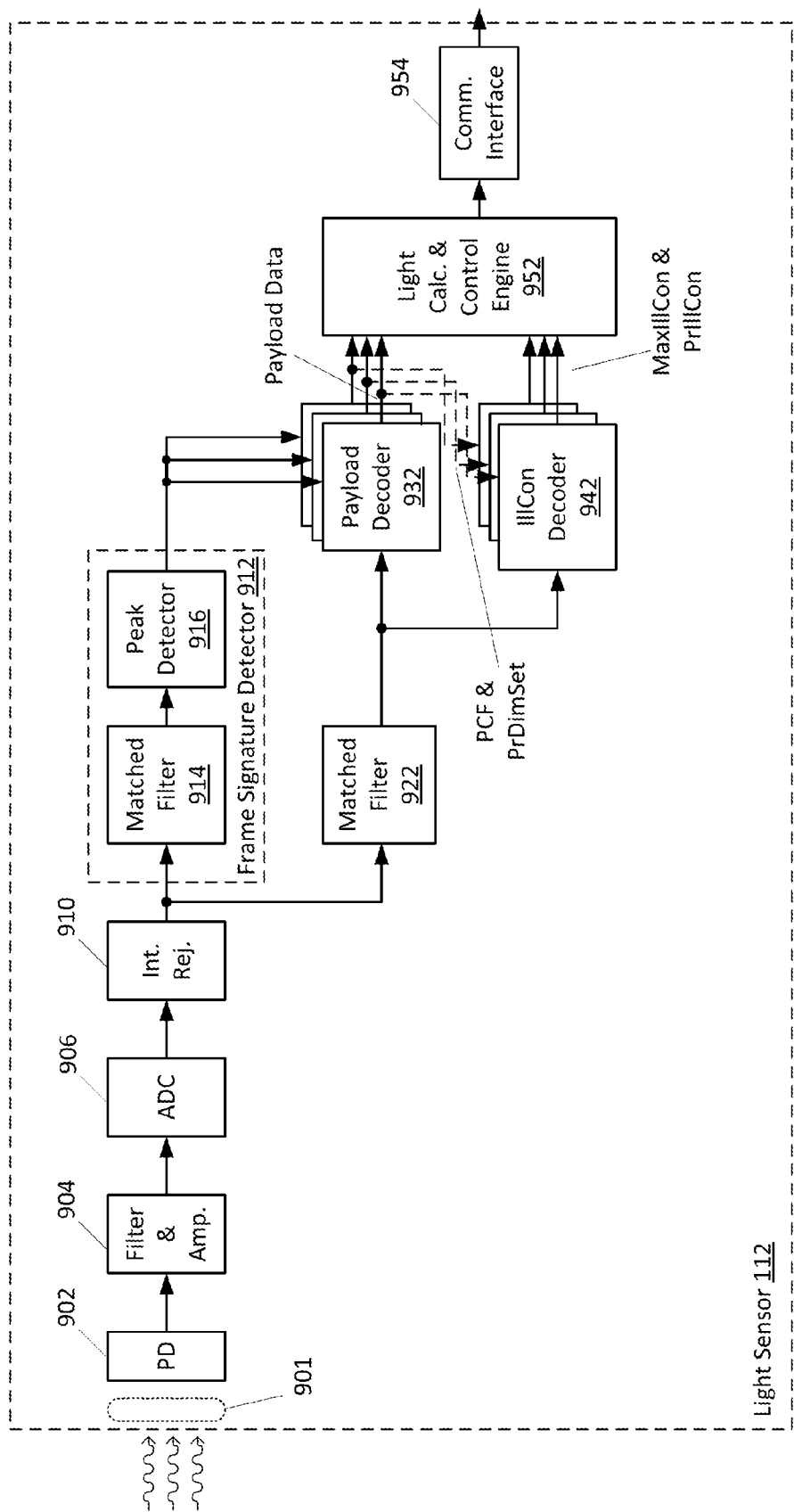
FIG. 9 is a high level block diagram of a light sensor, according to an embodiment of the present invention.

FIG. 9 will now be used to provide additional details of a light sensor 112, according to an embodiment of the present invention. For reasons that will be understood from the following discussion, the light sensor 112 in FIG. 9 can also referred to as a data and illumination contribution decoder and illumination controller. Referring to FIG. 9, the light sensor is shown as including a photodetector (PD) 902, filter and amplifier circuitry 904, an ADC 906 and optional interference rejection circuitry 910, which collectively digitize received visible light. The PD 902 can include one or more light detecting element, such as, but not limited to, a photo resistors, photovoltaic cells, photodiodes, phototransistors, charge-coupled devices (CCD), or the like, that can be used to produce a current or voltage indicative of the magnitude of detected light. Since the light levels of interest are visible light levels, and data is encoded into visible light, the PD 902 is preferably configured to primarily detect visible light, or at least generate an output that is primarily indicative of visible light. For example, the PD 902 can be covered by one or more optical filter that absorbs and/or reflects non-visible light, such as IR light, so that the output of the PD 902 is primarily indicative of detected visible light, and thus, has a response similar to that of a human eye (which is also referred to as a photopic response). Other IR rejection techniques, which are known in the art, can additionally or alternatively be used to achieve a photopic response. It is also possible the different light detecting elements of the PD 902 are covered by different color filters (e.g., red, green and blue filters) and the currents generated by the different light detecting elements of the PD are combined or otherwise processed in such a manner to generate an output having a photopic response. The filter and amplifier circuitry 904 can be used to filter out frequency components that are not of interest, and to amplifier the relatively low level analog signals that may be output by the PD 902 before such signal are converted to digital by the ADC 906. The optional interference rejection circuitry 910 can be used be used, e.g., to filter out periodic interference. There are well known techniques for performing such periodic interference rejection, and thus, there is no need to provide additional details of the circuitry 910. In certain embodiments, one or more lens or other optic elements, generally represented by block 901, is/are located in front of the PD 902. Focusing types of optical element(s) 901, which can be used to focus light from a relatively narrow range of angles onto the PD 902, would be useful where the light sensor 901 is built into augmented reality glasses or some other head mounted device (e.g., display) that enables the light sensor to detect an amount of visible light that a person's eyes are detecting. Alternatively, the optical element(s) 901 can provide a diffusion filter that collects light from a wide range of angles and directs it to the PD 902.

The light sensor 112 is also shown as including a frame signature detector 912, which includes a matched filter 914 and a peak detector 916. The matched filter 914 and the peak detector 916 are collectively used to identify frame signatures within the data encoded visible light, and thereby, are used to detect the relative timing of the frames within received data encoded visible light 106. In other words, a digitized version of the received data encoded visible light signal is passed through the matched filter 914 which is configured for use in detecting a frame signature. The peak detector 916 is used to monitor the output of the matched filter 914. Once a match is found, the payload decoder 932, discussed below, can begin decoding of the payload data based on an identified initial frame and slot timing as detected by the frame signature detector 912. As would be understood by those of ordinary skilled in the art, the matched filter operation can be implemented in a number of other ways that rely on correlation detection, but are not limited thereto. The matched filter 914 is also preferably constructed such that it suppresses low frequency and DC signals.

A further matched filter 922 is used to detect the data symbols (e.g., xyx data symbols) of the payload that are encoded into the data encoded visible light. The output of the matched filter 922 is provided to both the payload decoder 932 and an illumination contribution decoder 942. The payload decoder 932 also receives an output of the frame signature detector 912, which as is indicative of the relative timing of the received frames of the data encoded visible light. Assume that the data payload was encoded into intervals 16-150 of each frame, where within each interval, an xyx data symbol was either centered at time slot 5 to represent a "0" bit or centered at time slot 10 to represent a "1" bit. The payload decoder 932 can compare the power level of the matched filter 922 at the time slot to the power level of the matched filter 922 at the time slot 10 to determine whether a "0" bit or a "1" bit was encoded into the interval. Continuing with this example, a higher power level at the time slot 5 would be decoded as a 0 bit, and a higher power level at the time slot 10 would be decoded as a 1 bit. Continuing with this example, the payload decoder 932 would output 135 binary bits per frame that it decodes.

In accordance with specific embodiments, the illumination contribution decoder 942 determines the difference between average detected 'x' levels and 'y' levels for a plurality of data symbols within a detected frame. As mentioned above, this difference between average detected 'x' levels and 'y' levels, which can also be referred to as the average x-y delta, can be determined for a full frame, or just a portion thereof, such as just the payload portion or preamble portion of a frame, or just a portion of the payload and/or preamamle. The illumination contribution decoder 942 can then determine the MaxIllCon and PrIllCon for a light fixture 104 using the equations: MaxIllCon=(average x-y delta)*LSCF/PCF; and PrIllCon=MaxIllCon*PrDimSet. Where the x-y percentage calibration factor (PCF) is not equal to 1, or is not fixed, the PCF can be obtained from the payload data, as shown in dashed line in FIG. 9. Similarly, the PrDimSet can be obtained from the payload data. The operation of the illumination contribution decoder 942 will depend on the type of data symbols being used within the system. For example, if xyz data samples are being used, the illumination contribution decoder 942 would determine the difference between average detected 'x' levels and 'y' levels, and average detected 'y' levels and 'z' levels.

Still referring to FIG. 9, each light sensor 112 can include multiple instances of the components 932 and 942, which enables the light sensor 112 to receive data encoded visible light 106 from multiple light fixtures 104 at the same time, as discussed in additional detail below. The light sensor 112 is also shown as including a light calculation and control engine 952, which is discussed below. In specific embodiments, the components 912-952 are implemented using a digital signal processor (DSP). However, embodiments of the present invention are not limited to implementing such components using of a DSP. The light sensor 112 is also shown as including a communications interface 954 that enable the light sensor 112 to send the illumination level requests to the light fixtures 104. Standard communications links (e.g., ZigBee, Wibree, X-10, DALI, TIA-232, TIA-485, Ethernet, DMX512, EnOcean, Konnex, LonWorks, Z-Wave, 6LoPAN, Echelon, Bluetooth, Wi-Fi, etc.) can be used to transfer such requests from light sensors 112 to light fixtures 104.

Referring briefly back to FIG. 1, each light sensor 112 can receive data encoded visible light from each of a plurality of light fixtures 104 within the illustrated environment, wherein each of the light fixtures 104 emits its own visible light 106 having its own light fixture information encoded therein. For example, the light sensor 112a can receive data encoded visible light from each of the light fixtures 104a, 104b, 104c and 104d, wherein each of the light fixtures 104a, 104b, 104c and 104d respectively emits its own visible light 106a, 106b, 106c and 106d having its own light fixture information encoded therein. The light sensor 112a can simultaneously decode the data encoded visible light 106a, 106b, 106c and 106d by including multiple instances of the components 932 and 942 described with reference to FIG. 9, as mentioned above. This enables the light sensor 112a to detect the light fixture ID of each light fixture 104a, 104b, 104c and 104d, which is encoded into the payload portion of each data encoded visible light 106a, 106b, 106c and 106d. Each light fixture can include additional light fixture information in its payload, examples of which were discussed above. The light sensor 112a can also determine a separate MaxIllCon and PrIllCon for each light fixture 104. More specifically, the light sensor 112a can determine: a MaxIllCon and a PrIllCon for the light fixture 104a; a MaxIllCon and a PrIllCon for the light fixture 104b; a MaxIllCon and a PrIllCon for the light fixture 104c; and a MaxIllCon and a PrIllCon for the light fixture 104d.

The light sensor 112a may not be able to distinguish between light fixture information encoded into visible light 106a and 106b (emitted, respectively, by the light fixtures 104a and 104b) if frames of the data encoded visible light 106a and 106B begin at the same time with a same phase. However, as mentioned above, the randomizer 355 of the data positioner 354 of each light fixture 104 reduces the probability of this occurring. Even if this does occur from time to time, it's acceptable if the light sensor 112a is unable to decode a few frames from time to time, since the light fixture information is not time critical, and is often identical from frame to frame for a specific light fixture, until a dimming setting is changed.

Referring again to FIG. 9, the payload decoder(s) 932 and illumination contribution decoder(s) 942 of the light sensor 112 provide decoded payload data and detected MaxIllCon and PrIllCon values to the light calculation and control engine 952. Based on the information it receives, the light calculation and control engine 952 can perform various calculations and control light levels by requesting changes to dimmer settings. For example, the light calculation and control engine 952 can periodically (e.g., once per second) calculate a total illumination level (e.g., in lux) that is incident on the light sensor 112 (and more specifically, on the PD 902) from sources other than the controllable light fixtures 104 (e.g., from light fixtures not part of the system 102, sunlight, etc.). The light calculation and control engine 952 can also periodically (e.g., once per second) calculate the adjustments in light required to hit a specified target illumination level. The light calculation and control engine 952 can also determine which light fixtures 104 are the most efficient sources of the additional light required to hit the target illumination level. In accordance with an embodiment, the light calculation and control engine 952 stores (e.g., in one or more tables) of all the detected light fixtures IDs, and their corresponding MaxIllCon and PrIllCon values, as well as other parameters learned from decoded light fixture information. In an embodiment, the light calculation and control engine 952 calculates or otherwise determines which light fixtures 104 to command to which brightness (i.e., dimmer setting) to achieve a desired target illumination level, and then sends out those commands to specific light fixtures 104. More specifically, such commands are directed to specific light fixtures through use of the unique light fixture identifiers (IDs) that were received in the decoded payloads. For example, the light calculation and control engine 952 can determine what adjustments could be made to one or more dimmer settings for one or more of the light fixtures to achieve a target illumination level at the light sensor 112 in an energy efficient manner. The light calculation and control engine 952 can then send one or more dimmer setting adjustment requests to one or more of the light fixtures 104, wherein the dimmer setting adjustment requests are used to achieve the target illumination level at the light sensor 112 in an energy efficient manner.

For example, referring briefly back to FIG. 1, the light calculation and control engine 952 of the light sensor 112a may determine that the light fixture 104c can supply 200 lux to the light sensor 112a for 50 W, and that the light fixture 104d can supply 50 lux to the light sensor 112a for 5 W. Assuming that that target illumination level for the light sensor 112a is 70 lux, then the light calculation and control engine 952 may determine that the target illumination level can be achieved by requesting that the light fixture 104d use its minimum dimmer setting (i.e., 1) to emit visible light having full brightness, and requesting that the light fixture 104c uses its 10% percent dimmer setting (i.e., 0.1) to emit visible light having 10% of its full brightness. The light sensor 112 can send illumination level requests to the light fixtures 104c and 104d. The light fixtures 104c and 104d will receive their respective requests and either accept the request, or potentially deny the requests, e.g., using a conflict resolution algorithm. Assuming the requests are accepted, the light sensor 112a will receive confirmations from the light fixtures 104c and 104d that they accepted to the requests. The light sensor 112a can continue to adjust lighting levels as background lighting changes (e.g., cloud covers the sun, or the sun sets) to maintain the target illumination level. Target illumination levels can be fixed, are may be adjusted by a user, e.g., using a user interface such as a knob, keypad, slide bar, touchscreen, or the like. Target illuminations levels may also be dependent upon an input received from an occupancy sensor, such as a motion sensor. For example, when a motion sensor does not detect motion within a certain area for at least a specified amount of time, the target illumination level for that area can be reduced to save energy. Thereafter, when the motion sensor detects motion, the target illumination level for that area can be increased to that an appropriate level of light for workers in that area.

Preferably, illumination levels are gradually adjusted so as to not be visually distracting due to abrupt changes in illumination. There may also be a light spread target specified, which may result in the light sensor 112a instructing additional light fixtures 104 to emit visible light, to spread the light, which may sacrifice overall efficiency for a more pleasing environment as more of the background is lit-up.

In accordance with certain embodiments, each of the light fixtures 104 has a pre-set minimum brightness setting for providing minimum safe illumination levels when not under command of one of the light sensors 102.

In certain embodiments, the light calculation and control engine 952 of the light sensor 112 may identify "opportunistic light savings". This can involve pre-setting each of the light fixtures 104 to emit their maximum amount of light (i.e., presetting them at their minimum dimmer settings), and the light calculation and control engine 952 can determine what light fixtures 104 can have their illuminations levels reduced without allowing the detected illumination level to fall below a target illumination level.

In summary, embodiments of the present invention, described herein, can be used for a variety of lighting applications. For example, it is often desired to provide a certain level of illumination (often measured in lux or foot candles) for a specific worker or under specific working conditions. For specific examples, a worker that is doing general assembly activities may require only 200 lux on their work surface, while a worker that is doing detailed inspection work may require 500 lux on their work surface. Embodiments of the present invention described herein can be used to control light levels so that a target amount of light, without excess, can be provided for each worker, as well as to provide the target amount of light from the most efficient light fixture(s). In other words, the system described herein can be used to identify the most efficient light fixture(s) to provide a target illumination and to individually command each of the available light fixtures to utilize a specific dimming level to achieve the target illumination with the lowest power/energy usage. As mentioned above, the systems described herein can also support a mode of opportunistic reduction of light levels. For an example, assume that all of the light fixtures 104 of the system 102 shown in FIG. 1 initially emit light visible light corresponding to their respective minimum dimmer settings, meaning that each of the light fixtures is initially at its full brightness. Also assume that one of the light sensors 112a detects that background illumination levels (e.g., from natural light 116) plus the light fixture illumination levels result in a detected illumination level above a target illumination level. In such a situation, the light sensor 112 can send requests to one or more of the light fixtures 112 to lower their brightness level so that the target illumination level is maintained.

While various embodiments have been described above, it should be understood that they have been presented by way of example, and not limitation. It will be apparent to persons skilled in the relevant art that various changes in form and detail can be made therein without departing from the spirit and scope of the invention.

The breadth and scope of the present invention should not be limited by any of the above-described exemplary embodiments, but should be defined only in accordance with the following claims and their equivalents.

What is claimed is:

1. A method for use by a light sensor, the method comprising:
   (a) simultaneously receiving, from two or more light fixtures that emit data encoded visible light, a portion of the data encoded visible light emitted by each of the two or more of the light fixtures; and
   (b) determining, for each of the light fixtures from which a portion of data encoded visible light is simultaneously received, a unique identity of the light fixture, a maximum illumination contribution (MaxIllCon) for the light fixture, and a present illumination contribution (PrIllCon) for the light fixture.

2. The method of claim 1, further comprising:
   (c) determining, based on results of step (b), light level adjustments that can be made to achieve a desired level of light at the light sensor in an energy efficient manner.

3. The method of claim 2, wherein step (c) comprises determining, for at least one of the two or more light fixtures from which a portion of data encoded visible light is received, a dimmer setting adjustment, and wherein the method further comprises:
   (d) sending, to at least one of the two or more light fixtures from which a portion of data encoded visible light is received, one or more dimmer setting adjustment requests produced in dependence on results of step (c), wherein each of the dimmer setting adjustment requests is directed to a specific one of the light fixtures through use of the unique identity of the light fixture that is determined at step (b).

4. The method of claim 1, further comprising:
   (c) when an illumination level at the light sensor is below a target illumination level, determining one or more light level adjustments that can be made to at least one of the light fixtures to increase the illumination level at the light sensor to achieve the target illumination level, wherein step (b) is performed in dependence on results of step (b) and taking energy efficiency into account; and (d) sending, to at least one of the light fixtures, one or more dimmer setting adjustment requests produced in dependence on results of step (c), wherein each of the one or more dimmer setting adjustment requests is directed to a specific one of the light fixtures through use of the unique identity of the light fixture that is determined at step (b).

5. The method of claim 1, further comprising:

(c) when an illumination level at the light sensor is above a target illumination level, determining one or more light level adjustments that can be made to at least one of the light fixtures to reduce energy usage while still maintaining the illumination level at the light sensor at least the target illumination level, wherein step (b) is performed in dependence on results of step (b) and taking energy efficiency into account; and (d) sending, to at least one of the light fixtures, one or more dimmer setting adjustment requests produced in dependence on results of step (c), wherein each of the one or more dimmer setting adjustment requests is directed to a specific one of the light fixtures through use of the unique identity of the light fixture that is determined at step (b).

6. A light sensor, comprising:

a photodetector that simultaneously receives, from two or more light fixtures that emit data encoded visible light, a portion of the data encoded visible light emitted by each of the two or more of the light fixtures; and an illumination contribution decoder that determines, for each of the light fixtures from which a portion of data encoded visible light is simultaneously received by the photodetector, a unique identity of the light fixture, a maximum illumination contribution (MaxIllCon) for the light fixture, and a present illumination contribution (PrIllCon) for the light fixture.

7. The light sensor of claim 6, further comprising a light calculation and control engine that determines one or more dimmer setting adjustments that can be made to one or more of the light fixtures from which a portion of data encoded visible light is received in order to achieve a desired level of light at the light sensor in an energy efficient manner.

8. The light sensor of claim 7, further comprising:

a communication interface that sends, to at least one of the two or more light fixtures from which a portion of data encoded visible light is received, one or more dimmer setting adjustment requests;

wherein each of the dimmer setting adjustment requests is directed to a specific one of the light fixtures through use of the unique identities determined for the light fixtures.

9. The light sensor of claim 7, wherein the illumination contribution decoder and the light calculation and control engine are implemented using a digital signal processor (DSP).

10. The light sensor of claim 6, further comprising:

a light calculation and control engine that determines, based on the MaxIllCon and the PrIllCon determined for each of the light fixtures from which a portion of data encoded visible light is received by the photodetector, one or more dimmer setting adjustments that can be made to at least one of the light fixtures to increase the illumination level at the light sensor to achieve the target illumination level in an energy efficient manner, when an illumination level at the light sensor is below a target illumination level; and a communication interface that sends, to at least one of the two or more light fixtures from which a portion of data encoded visible light is received by the photodetector, one or more dimmer setting adjustment requests that are used to increase the illumination level at the light fixture to the target illumination level in an energy efficient manner;

wherein each of the dimmer setting adjustment requests is directed to a specific one of the light fixtures through use of the unique identities determined for the light fixtures.

11. The light sensor of claim 10, wherein the illumination contribution decoder and the light calculation and control engine are implemented using a digital signal processor (DSP).

12. The light sensor of claim 6, further comprising:

a light calculation and control engine that determines, based on the MaxIllCon and the PrIllCon determined for each of the light fixtures from which a portion of data encoded visible light is received by the photodetector, and taking energy efficiency into account, one or more dimmer setting adjustments that can be made to at least one of the light fixtures to reduce energy usage while still maintaining the illumination level at the light sensor at at least a target illumination level, when an illumination level at the light sensor is above the target illumination level; and a communication interface that sends, to at least one of the two or more light fixtures from which a portion of data encoded visible light is received by the photodetector, one or more dimmer setting adjustment requests that are used to reduce energy usage while still maintaining the illumination level at the light sensor at least the target illumination level;

wherein each of the dimmer setting adjustment requests is directed to a specific one of the light fixtures through use of the unique identities determined for the light fixtures.

13. The light sensor of claim 12, wherein the illumination contribution decoder and the light calculation and control engine are implemented using a digital signal processor (DSP).

14. The light sensor of claim 6, wherein the illumination contribution decoder is implemented using a digital signal processor (DSP).

15. A method for use by a light fixture including a light source that emits visible light, the method comprising:

(a) receiving a drive signal generated in dependence on a dimmer setting;

(b) encoding data symbols into the received drive signal to produce a data encoded drive signal that includes the light fixture information encoded therein, wherein first portions of the data encoded drive signal includes data symbols, and second portions of the data encoded drive signal, which are between the first portions, do not include data symbols; and (c) driving the light source with the data encoded drive signal to thereby cause the light source to emit data encoded visible light having the light fixture information encoded therein;

wherein step (b) includes (b.1) selectively adjusting a magnitude of the received drive signal to achieve at least two different levels that differ from a level of the received drive signal, to thereby generate the first portions of the data encoded drive signal that include data symbols;

(b.2) passing through the received drive signal without adjusting the received drive signal, to thereby generate the second portions of the data encoded drive signal that do not include data symbols; and (b.3) producing the data encoded drive signal in a manner that avoids visually perceptible flicker in the data encoded visible light that is emitted by the light source in response to the light source being drive by the data encoded drive signal.

16. The method of claim 15, further comprising, prior to step (a), generating the drive signal in dependence on the dimmer setting, wherein the drive signal is one of a DC drive or a PWM drive signal.

17. The method of claim 15, wherein the light fixture information, included in the emitted data encoded visible light, includes a light fixture specific identifier and also includes information about of one or more of the following:
present dimmer setting,
operating temperature,
total operating hours,
power supply fault condition,
fan not operating,
cooling system failure,
fan operating speed,
remaining warranty period,
remaining operational lifetime,
current power usage,
historical power usage,
luminous efficacy,
peak current usage,
maximum current rating,
control key,
encryption key,
supported dimming range,
supported communication protocol, or
wireless control channel/frequency information.

18. The method of claim 15, wherein:
the light fixture information includes a light fixture specific identifier, a present dimmer setting and calibration information;
the calibration information enables a light sensor that receives a portion of the date encoded visible light to determine a maximum illumination contribution (MaxIllCon) corresponding to the light fixture; and
the present dimmer setting enables a light sensor that receives a portion of the date encoded visible light to determine a present illumination contribution (PrIllCon) corresponding to the light fixture.

19. The method of claim 15, further comprising:
producing a data signal including a plurality of consecutive frames, each of which includes a frame signature and payload data, the payload data including the light fixture information; and
wherein step (b) also includes
receiving the data signal; and
producing the data encoded drive signal that includes the light fixture information encoded therein by encoding data symbols corresponding to the data signal into the received drive signal.

20. A light fixture, comprising:
a data encoder that receives a drive signal generated in dependence on a dimmer setting, and encodes data symbols into the received drive signal to produce a data encoded drive signal that includes the light fixture information encoded therein;
a light source that, in response to being driven by the data encoded drive signal, emits data encoded visible light having the light fixture information encoded therein;

wherein first portions of the data encoded drive signal includes data symbols, and second portions of the data encoded drive signal, which are between the first portions, do not include data symbols;
wherein in order to generate the first portions of the data encoded drive signal that include data symbols, the data encoder selectively adjusts a magnitude of the received drive signal to achieve at least two different levels that differ from a level of the received drive signal;
wherein in order to generate the second portions of the data encoded drive signal that do not include data symbols, the data encoder passes through the received drive signal without adjusting the received drive signal; and
wherein data encoder generates the data encoded drive signal in a manner that avoids visually perceptible flicker in the data encoded visible light that is emitted in response to the light source being drive by the data encoded drive signal.

21. The light fixture of claim 20, further comprising:
a dimmer controller that generates the drive signal in dependence on the dimmer setting; and
wherein the drive signal, generated by the dimmer controller, is one of a DC drive signal or a PWM drive signal.

22. The light fixture of claim 20, wherein the light fixture information, included in the emitted data encoded visible light, includes a light fixture specific identifier and also includes information about of one or more of the following:
present dimmer setting,
operating temperature,
total operating hours,
power supply fault condition,
fan not operating,
cooling system failure,
fan operating speed,
remaining warranty period,
remaining operational lifetime,
current power usage,
historical power usage,
luminous efficacy,
peak current usage,
maximum current rating,
control key,
encryption key,
supported dimming range,
supported communication protocol, or
wireless control channel/frequency information.

23. The light fixture of claim 20, wherein:
the light fixture information includes a light fixture specific identifier, a present dimmer setting and calibration information;
the calibration information enables a light sensor that receives a portion of the data encoded visible light to determine a maximum illumination contribution (MaxIllCon) corresponding to the light fixture; and
the present dimmer setting enables a light sensor that receives a portion of the date encoded visible light to determine a present illumination contribution (PrIllCon) corresponding to the light fixture.

24. The light fixture of claim 20, further comprising:
a data generator that produces a data signal including a plurality of consecutive frames, each of which includes a frame signature and payload data, the payload data including the light fixture information; and
wherein the data encoder is also configure to
receive, from the data generator, the data signal; and
produce the data encoded drive signal that includes the light fixture information encoded therein by encoding data symbols corresponding to the received data signal into the received drive signal.

25. The light fixture of claim 24, wherein the data encoder includes:
- a data positioner configured to produce a pulse positioned signal that includes pulses that are positioned in dependence on slot values included in the data signal received from the data generator; and
- a symbol generator configured to
  - receive the pulse positioned signal produced by the data positioner; and
  - embed the data symbols into the received drive signal in dependence on the received pulse positioned signal.

* * * * *